United States Patent
Crill et al.

(10) Patent No.: US 11,410,028 B2
(45) Date of Patent: Aug. 9, 2022

(54) PHOTONIC NEURAL NETWORK SYSTEM

(71) Applicant: Look Dynamics, Inc., Longmont, CO (US)

(72) Inventors: Rikki J. Crill, Longmont, CO (US); Jonathan C. Baiardo, Carbondale, CO (US); David A. Bruce, Niwot, CO (US)

(73) Assignee: Look Dynamics, Inc., Longmont, CO (US)

( * ) Notice: Subject to any disclaimer, the term of this patent is extended or adjusted under 35 U.S.C. 154(b) by 761 days.

(21) Appl. No.: 16/137,522

(22) Filed: Sep. 20, 2018

(65) Prior Publication Data

US 2019/0095784 A1 Mar. 28, 2019
US 2020/0012928 A9 Jan. 9, 2020

Related U.S. Application Data

(60) Provisional application No. 62/561,061, filed on Sep. 20, 2017, provisional application No. 62/625,711, (Continued)

(51) Int. Cl.
*G06N 3/06* (2006.01)
*G06N 3/067* (2006.01)
(Continued)

(52) U.S. Cl.
CPC ......... *G06N 3/0675* (2013.01); *G06N 3/0454* (2013.01); *G06N 3/08* (2013.01); *G06N 3/084* (2013.01)

(58) Field of Classification Search
CPC ...... G06N 3/0675; G06N 3/0454; G06N 3/08; G06N 3/084
See application file for complete search history.

(56) References Cited

U.S. PATENT DOCUMENTS 3,689,772 A 9/1972 George et al.
3,771,124 A 11/1973 McMahon
(Continued)

FOREIGN PATENT DOCUMENTS

CN 101903892 A 12/2010
EP 0516106 12/1992
(Continued)

OTHER PUBLICATIONS

"Extended European Search Report", for Look Dynamics, Application No. 18857686.2-1208/3685320, POT/2018/052096, dated May 18, 2021, 9 pages.
(Continued)

*Primary Examiner* — Li Wu Chang
(74) *Attorney, Agent, or Firm* — James R. Young; Cochran Freund & Young LLC

(57) ABSTRACT

A system (10) for convolving and adding frames of data comprises a first sensor-display device (14) and a second sensor display device (26). Each sensor display device (14, 26) comprises an array (80) of transmit-receive modules (82). Each transmit-receive module (82) comprises a light sensor element (86), a light transmitter element (84), and a memory bank (90). A radial modulator device (20) is positioned where transmission of light fields comprising frames of data are Fourier transformed. Filters implemented by modulator elements of the radial modulator device (20) convolve the fields of light comprising the frames of data, which are then sensed on a pixel-by-pixel basis by the light sensor elements (86), which accumulate charges, thus sum pixel values of sequential convolved frames of data.

10 Claims, 28 Drawing Sheets

Related U.S. Application Data filed on Feb. 2, 2018, provisional application No. 62/663,465, filed on Apr. 27, 2018.

(51) Int. Cl.
*G06N 3/08* (2006.01)
*G06N 3/04* (2006.01)

(56) References Cited

U.S. PATENT DOCUMENTS

| | | | |
|---|---|---|---|
| 3,796,497 A | 3/1974 | Mathisen et al. | |
| 3,891,968 A | 6/1975 | McMahon | |
| 4,218,623 A | 8/1980 | Utagawa | |
| 4,360,799 A | 11/1982 | Leighty et al. | |
| 4,462,046 A | 7/1984 | Spight | |
| 4,513,441 A | 4/1985 | Henshaw | |
| 4,514,059 A | 4/1985 | McDonnell | |
| 4,573,198 A | 2/1986 | Anderson | |
| 4,672,683 A | 6/1987 | Matsueda | |
| 4,735,487 A | 4/1988 | Thorwirth et al. | |
| 4,923,297 A | 5/1990 | Arndt | |
| 4,950,050 A | 8/1990 | Pernick et al. | |
| 4,980,922 A | 12/1990 | Leib | |
| 5,097,352 A | 3/1992 | Takahashi et al. | |
| 5,119,443 A | 6/1992 | Javidi et al. | |
| 5,148,522 A | 9/1992 | Okazaki | |
| 5,172,000 A | 12/1992 | Scheff et al. | |
| 5,173,954 A | 12/1992 | Kato | |
| 5,177,559 A | 1/1993 | Batchelder et al. | |
| 5,216,541 A | 6/1993 | Takesue et al. | |
| 5,220,622 A | 6/1993 | Scarr | |
| 5,224,173 A | 6/1993 | Kuhns et al. | |
| 5,257,322 A | 10/1993 | Matsuoka et al. | |
| 5,264,912 A | 11/1993 | Vaught et al. | |
| 5,267,332 A | 11/1993 | Walch et al. | |
| 5,309,522 A | 5/1994 | Dye | |
| 5,309,523 A | 5/1994 | Iwaki et al. | |
| 5,323,472 A | 6/1994 | Falk | |
| 5,327,286 A | 7/1994 | Sampsell et al. | |
| 5,363,043 A | 11/1994 | Xiang et al. | |
| 5,363,456 A | 11/1994 | Bousselet | |
| 5,392,132 A * | 2/1995 | Yamamoto | H04N 1/00095 358/407 |
| 5,418,380 A | 5/1995 | Simon | |
| 5,471,066 A | 11/1995 | Hagiwara | |
| 5,479,303 A | 12/1995 | Suzuki et al. | |
| 5,515,453 A | 5/1996 | Hennessey et al. | |
| 5,523,881 A | 6/1996 | Florence et al. | |
| 5,539,411 A | 7/1996 | Yu et al. | |
| 5,579,471 A | 11/1996 | Barber et al. | |
| 5,581,383 A | 12/1996 | Reichel et al. | |
| 5,630,022 A | 5/1997 | Ono | |
| 5,659,637 A | 8/1997 | Bagley et al. | |
| 5,699,449 A | 12/1997 | Javidi | |
| 5,729,704 A | 3/1998 | Stone et al. | |
| 5,761,330 A | 6/1998 | Stoianov et al. | |
| 5,761,655 A | 6/1998 | Hoffman | |
| 5,796,435 A | 8/1998 | Nonomura et al. | |
| 5,802,361 A | 9/1998 | Wang et al. | |
| 5,815,598 A | 9/1998 | Hara et al. | |
| 5,841,907 A | 11/1998 | Javidi et al. | |
| 5,841,978 A | 11/1998 | Rhoads | |
| 5,867,600 A | 2/1999 | Hongu | |
| 5,893,095 A | 4/1999 | Jain et al. | |
| 5,915,250 A | 6/1999 | Jain et al. | |
| 5,963,667 A * | 10/1999 | Hashimoto | G06K 9/74 382/190 |
| 5,987,183 A | 11/1999 | Saunders et al. | |
| 5,991,781 A | 11/1999 | Nielsen | |
| 6,026,416 A | 2/2000 | Kanerva et al. | |
| 6,131,067 A | 10/2000 | Girerd et al. | |
| 6,424,449 B1 | 7/2002 | Namiki | |
| 6,445,822 B1 | 9/2002 | Crill | |
| 6,529,614 B1 | 3/2003 | Chao et al. | |
| 6,678,411 B1 | 1/2004 | Crill | |
| 7,103,223 B2 | 9/2006 | Crill | |
| 7,302,100 B2 | 1/2007 | Crill | |
| 7,988,297 B2 | 8/2011 | Crill | |
| 2003/0219158 A1 | 11/2003 | Crill | |
| 2004/0156098 A1 | 8/2004 | Dubois et al. | |
| 2006/0290777 A1 | 12/2006 | Iwamoto et al. | |
| 2007/0076280 A1 | 4/2007 | Crill | |
| 2008/0012850 A1 | 1/2008 | Keating, III | |
| 2010/0177164 A1 | 7/2010 | Zalevsky et al. | |
| 2011/0137645 A1* | 6/2011 | Vary | G10L 19/00 704/222 |
| 2017/0132496 A1 | 5/2017 | Shoaib et al. | |

FOREIGN PATENT DOCUMENTS

| | | |
|---|---|---|
| GB | 2312535 | 10/1997 |
| IL | 205174 | 12/2015 |
| JP | 02091607 | 3/1990 |
| JP | 2001142029 | 5/2001 |
| JP | 5352591 | 8/2013 |
| RU | 2480824 | 4/2013 |
| WO | WO9834180 | 8/1998 |
| WO | WO0017809 | 3/2000 |
| WO | 2012127246 A1 | 9/2012 |

OTHER PUBLICATIONS

G. T. Sincerbox; "Holographic Image Converter for Optical Information Processing", IBM Technical Disclosure Bulletin, vol. 27, No. 7A, Dec. 1984, pp. 3745-3746.

D. Casasent et al., "Diffraction Pattern Sampling Using a Computer-Generated Hologram", Applied Optics, vol. 25, No. 6, Mar. 1986; pp. 983-989.

Z. Chen et al.; Hybrid Optical/Digital Access Control Using Fingerprint Identification. Optical Engineering, vol. 34, No. 3, Mar. 1995; pp. 834-838.

PCT/US2018/052095 International Search Report; dated Jan. 2, 2019.

* cited by examiner

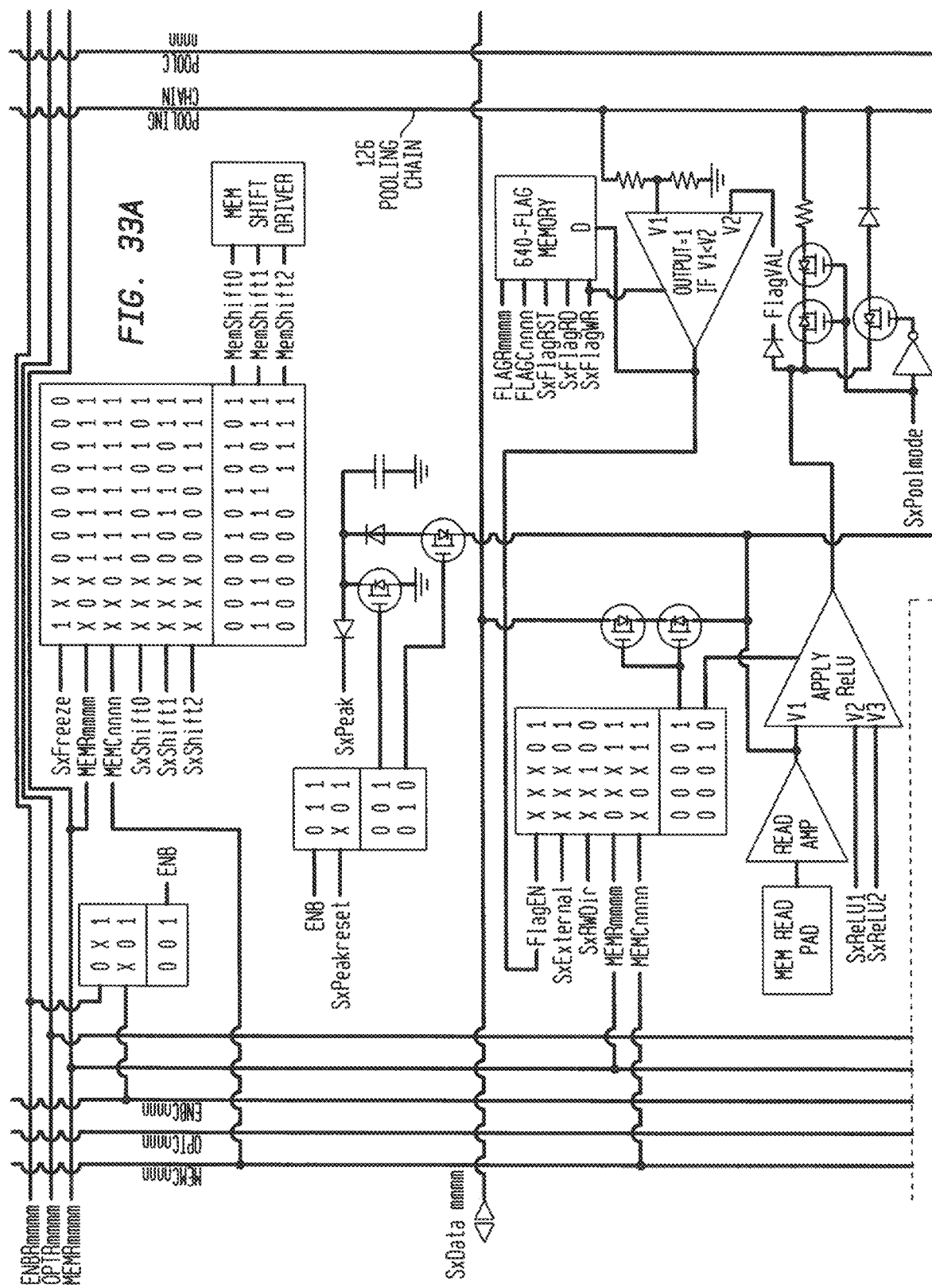

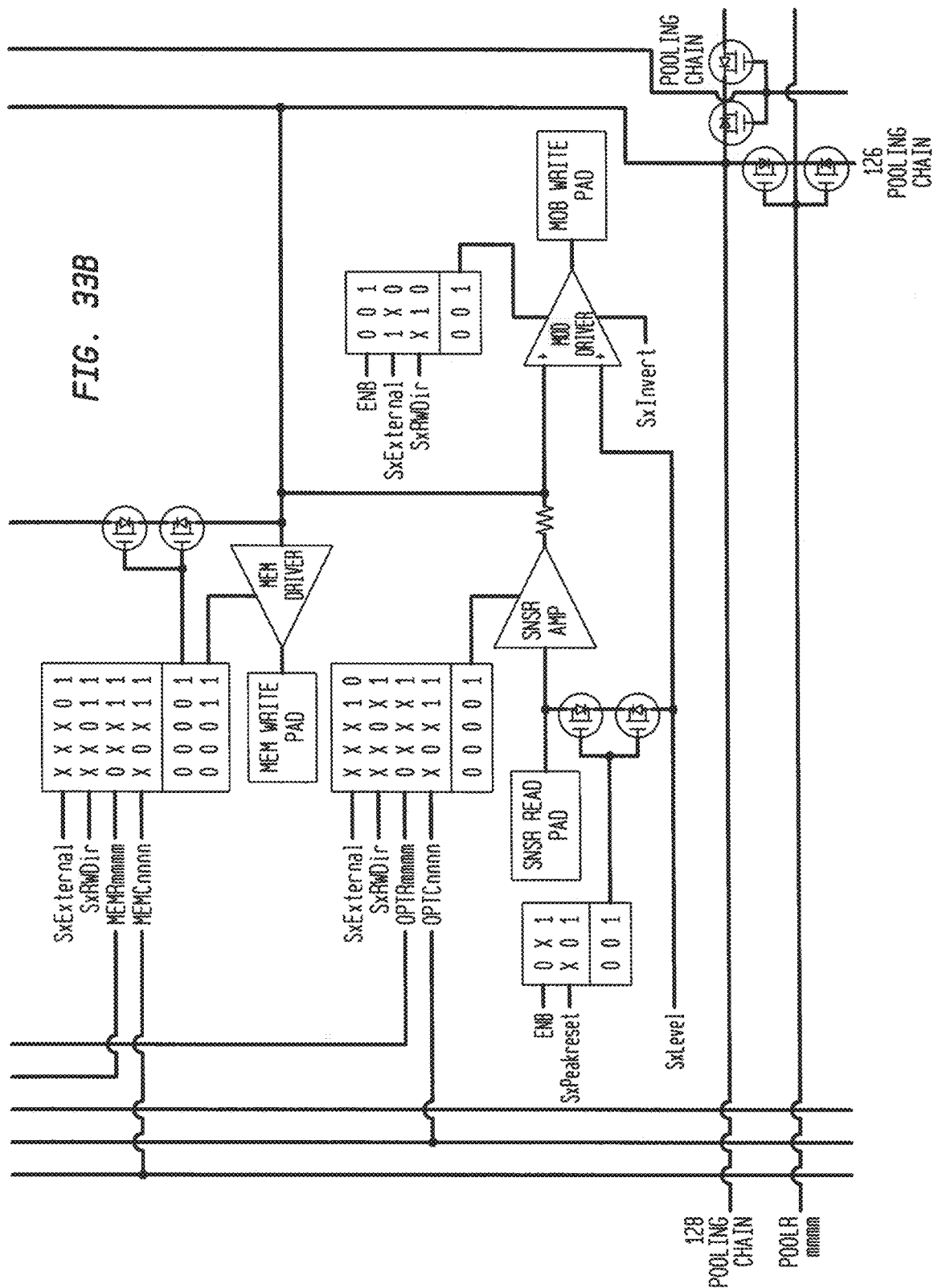

PHOTONIC NEURAL NETWORK SYSTEM

BACKGROUND

Field of the Invention

This invention is related to neural networks and more specifically to convolutional neural networks with optical processing.

State of the Prior Art

Neural networks are well-known as computing systems comprising a number of simple, highly interconnected processing elements, which process information by their dynamic state response to external inputs. Neural networks recognize patterns and are useful for clustering and classifying data. Computers can utilize neural networks to implement machine learning in which a computer learns to perform some task by analyzing training examples. Usually, the examples have been labeled in advance by a user. A neural network set up as an object or image recognition system, for instance, could be fed thousands of example images labeled as either "cat" or "no cat," and then using the results to identify cats in other images or to indicate that there are no cats in other images, as the case may be. Alternatively, such a neural network set up as an object recognition system could be fed thousands of examples of images with various objects, such as cats, cows, horses, pigs, sheep, cars, trucks, boats, and airplanes and labeled as such, and then using the results to identify whether other images have any cats, cows, horses, pigs, sheep, cars, trucks, boats, or airplanes in them.

A convolutional neural network (CNNs) is a kind of neural network that uses many identical copies of the same neuron, which enables the network to have many neurons and to express computationally large models while the number of actual values describing how the neurons behave, which need to be learned, fairly small. A convolution is a way of combining two signals to form a third signal. CNN's are usually implemented in software or programmable digital hardware.

Deep learning is a term used for stacked neural networks, i.e., networks comprising several layers. Layers are made of nodes. A node is a place where computation takes place, loosely patterned on a neuron in a human brain, which fires when it encounters sufficient stimuli. A node combines input from the data with a set of coefficients, or weights that either amplify or dampen that input, thereby assigning significance to inputs for the task the algorithm is trying to learn, e.g., which input is most helpful in classifying data without error. These input times weight products are summed, and the sum is passed through a node's activation function to determine whether and to what extent that signal progresses further through the network to affect the ultimate outcome, such as an act of classification. A node layer is a row of those neuron-like switches that turn on or off as the input is fed through the network. Each layer's output is simultaneously the subsequent layer's input, starting from the initial input layer that receives the data. More than three node layers are considered "deep" learning. In deep learning networks, each layer of nodes trains on a distinct set of features based on the previous layer's output, so the more layers through which the data (e.g., pictures, images, speech, etc.) passes, the more complex the features that the nodes can recognize. During training, adjustments are provided with a process called backpropagation to increase the likelihood of the network to predict the same kind of image the next time around. Such data processing and backpropagation is done over and over until the predictions are reasonably accurate and are not improving. The neural network can then be utilized in inference mode to classify new input data and predict a result that is inferred from its training.

A typical convolutional neural network has four essential layers of neurons besides the input and output layers: Convolution, activation, pooling, and fully connected. In the initial convolution layer or layers, thousands of neurons act as a first set of filters that scour every part and pixel in an image, looking for patterns. As more and more images are processed, each neuron gradually learns to filter for specific features, which improves accuracy. Effectively, the convolutional layer or layers breaks an image down into different features. The activation layer then highlights the salient features, e.g., features that are likely to have value or importance in the ultimate identification result. For example, an eye is likely to indicate a face and not a frying pan.

All of the convolution and activation across an entire image generates large amounts of data and can overwhelm computational capacity of a computer, so pooling is used to condense the data into a form that is easier to handle. Pooling is a process of selecting the best data and discarding the rest, resulting in a lower-resolution data set. Several kinds of pooling can be used, some of the more common kinds being "max pooling" and "mean pooling."

Finally, in the fully connected layer, each reduced or "pooled" feature map or data is connected to output nodes (neurons) that represent the items that the neural network is learning to, or has been enabled to, identify, for example, cat, cow, horse, pig, sheep, car, truck, boat, and airplane. As the feature maps or data are run through these output nodes, each node votes for any feature map or data that the node identifies as its particular item. The final output of the network for an image data that has run through the network is based on the votes of the individual nodes. Earlier in the training of the network, the votes may produce more erroneous outputs, but, with increasing numbers of images and backpropagations to adjust weights and refine the training, accuracy improves, so, eventually, the predictions or inferences of results from input data can be quite accurate.

The foregoing examples of related art and limitations related therewith are intended to be illustrative, but not exclusive or exhaustive, of the subject matter. Other aspects and limitations of the related art will become apparent to those skilled in the art upon a reading of the specification and a study of the drawings.

BRIEF DESCRIPTION OF THE DRAWINGS

The accompanying drawings, which are incorporated herein and form a part of the specification, illustrate some, but not the only or exclusive, example embodiments and/or features. It is intended that the embodiments and figures disclosed herein are to be considered illustrative rather than limiting. In the drawings:

FIGS. 33A-B show a schematic diagram of an overview of the transmit-receive module (trixel) circuitry;

DETAILED DESCRIPTION OF EXAMPLE EMBODIMENTS

Figure 1:
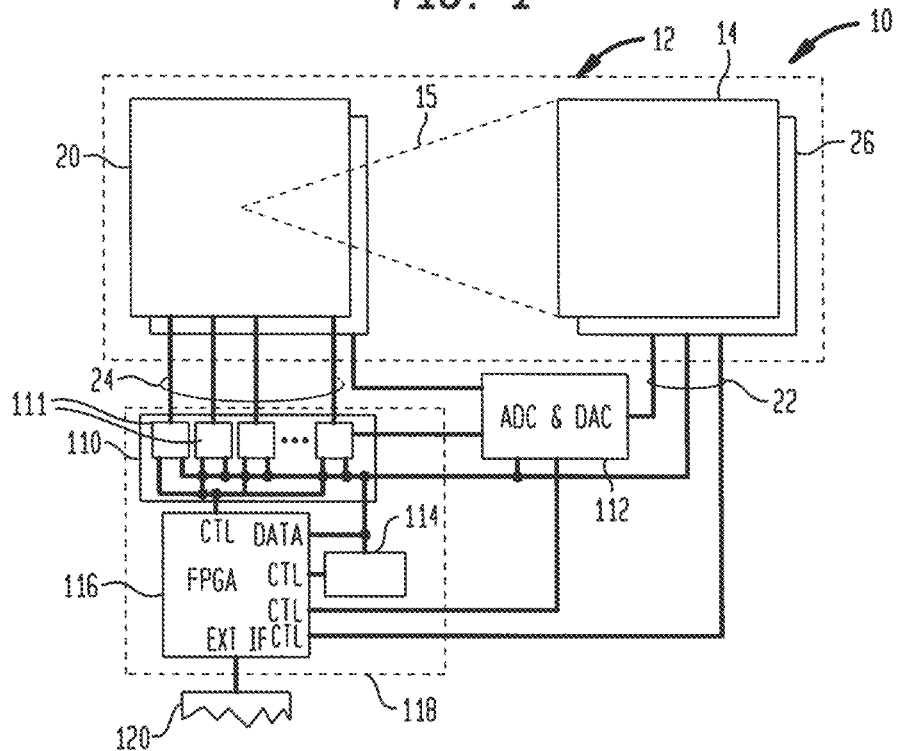
FIG. 1 is a function block diagram for an example photonic neural network system.
Figure 2:
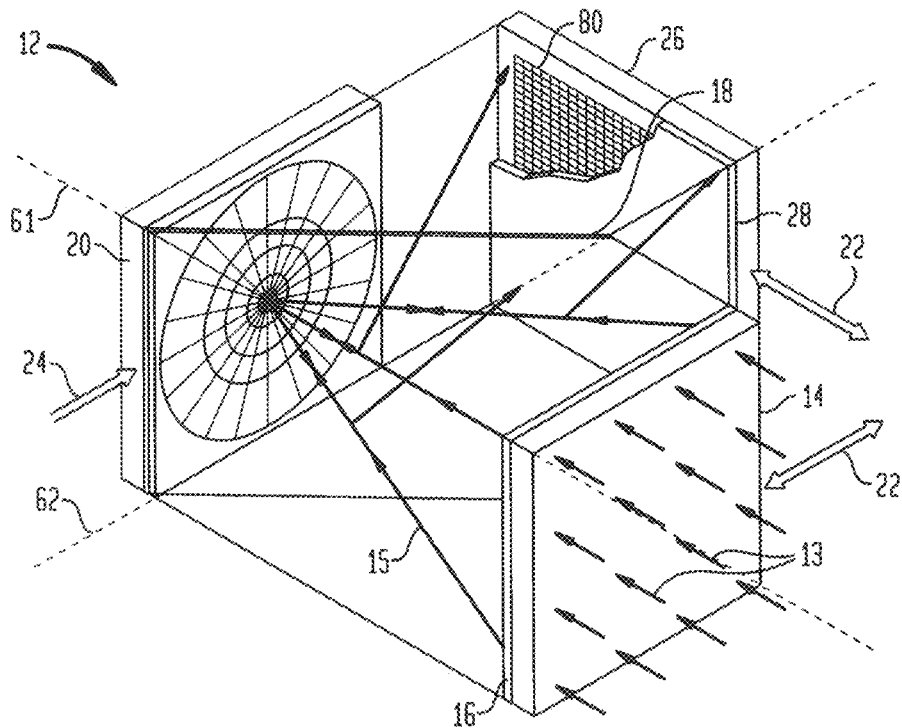
FIG. 2 is an isometric view of an example photonic convolution assembly for optically processing and convoluting images for the photonic neural network system in FIG. 1, a portion of the second Fourier transform lens being shown broken away to reveal the array of light sensor-display components of the second sensor-display device.

A function block diagram of an example photonic neural network system 10 is shown in FIG. 1, and an isometric view of an example photonic convolution assembly 12 for optically processing and convoluting images for the photonic neural network system 10 is shown in FIG. 2. Convolutions with this photonic neural network system 10 are performed with optical Fourier transforms, which greatly increases speed, resolution, and power efficiency as compared to digital spatial convolutions, so producing and using neural networks can be done orders of magnitude faster and with much less power consumption than typical computational convolutions and processing with computer algorithms. Power consumption is very low, since all of the convolutions and sums are completely analog, full frame, photonic calculations. Summing is accomplished by building charges in capacitive light sensors, as will be explained below, which is an analog process. Sensors are very low noise, and there is no clocking or other sources of transient noise, so the summing is a very low noise process. The photonic neural network 10 can accept and process any data, such as images, video, sound, speech patterns, or anything normally processed by convolutional neural networks, and it supports all existing convolutional neural net architectures and training methods. The photonic neural network 10 also provides full-frame image parallelism at full resolution processed at the speed of light and with an architecture where every data element is in its ideal location for the next stage, so it is nearly 100 percent efficient. Other advantages can be understood from this description.

With reference to both FIGS. 1 and 2, the optical processing of images for the example photonic neural network system 10 is performed with the photonic convolution assembly 12. Essentially, a first sensor-display device 14 projects a frame of data (e.g., an image or an optical representation of other data, such as sound, speech pattern, video, etc.) as a modulated light field 15 through a first Fourier transform lens 16 and through a polarizer 18 to a radial modulator device 20 positioned in the focal plane of the lens 16, as will be explained in more detail below. The frame of data projected by first sensor-display device 14 is formed by the first sensor-display device 14 based on values or signals provided to the first sensor-display device 14 by support electronics (described in more detail below) via an electronic data interface 22. The Fourier transform lens 16 can be a diffraction lens, a solid convex lens, or any other form of Fourier transform lens can be used. Also, a fiber faceplate (not shown) can be positioned in front of the lens 16 to collimate the light before entering the lens 16.

The lens 16 transforms the frame of data (e.g., image) to its Fourier equivalent at the focal plane (also called the Fourier transform plane), thus at the surface of the radial modulator device 20, The radial modulator device 20 modulates the light field 15 comprising the Fourier equivalent of the frame of data at the Fourier transform plane based on patterns (also called "filters") loaded into the radial modulator device 20 by support electronics (described in more detail below) via an electronic data interface 24 and reflects the modulated frames of data to the second sensor-display device 26, which detects the results. The reflected light field comprising the modulated frames of data inverse Fourier transform back into the spatial domain in the distance from the radial modulator device 20 to the second sensor-display device 26, so the modulated data frames incident on the second sensor-display device 26 are spatial domain features of the frame of data that have passed, i.e., were not filtered out by, the radial modulator device 20 at the Fourier transform plane. The results are detected by the second sensor-display device 26 on a pixel-by-pixel basis wherein light incident on each pixel produces an electric charge in proportion to the intensity of the light and the time that the light is incident on the pixel. Each frame of data emanating from the first sensor-display device 14 can be modulated with one or more filters (patterns) by the radial modulator device 20. Also, the second sensor-display device 26 can receive one or more frames of data from the first sensor-display device 14 modulated by one or more filters applied in the radial modulator device 20. Therefore, the electric charge build-up for each pixel in the second sensor-display device 26 may be the sum of one or more modulated (i.e., filtered) patterns of one or more frames of data, as will be described in more detail below, thereby constituting a convolution of the frame or frames of data that were projected by the first sensor-display device 14.

For example, one frame of data can be projected sequentially by the first sensor-display device 14, first in red, then in green, and then in blue, and the radial modulator device 20 can apply the same or different filters (pattern modulations) to each of the red, green, and blue projections. All of those modulated frames of data can be detected sequentially by the second sensor-display device 26 with the light from each of those sequentially modulated frames of data adding to the electric charges for each respective pixel of the second sensor-display device 26. Then, those electric charges for each respective pixel of the second sensor-display device 26 are transferred to respective memory cells of the respective pixels of the second sensor-display device 26, which store these summed results for each respective pixel of the second sensor-display device 26, thereby comprising stored pixel values of a convolution of the frame of data in the spatial domain that was projected in the spatial domain by the first sensor-display device 14 and convolved in the Fourier transform domain by the filters in the radial modulator device 20.

That process can be repeated for red, green, and blue projections of the same frame of data from the first sensor-display device 14, but with different filters in the radial modulator device 20, thus different modulation patterns from the Fourier transform domain reflected by the radial modulator device 20 to the second sensor-display device 26, thereby resulting in another summed result and another set of stored pixel values of another convolved frame of data in the memory bank of the second sensor-display device 26. Those accumulating convolved frames of data in the second sensor-display device 26 form a 3D convolution block from the frame of data that was projected by the first sensor-display device 14 for all of those different filter applications by the radial modulator device 20. In summary, the frame of data from the first sensor-display device 14 is multiplied by a series of filters in the Fourier plane by the radial modulator device 20 and summed by the second sensor-display device 26 in a sequence that builds a 3D convolution block in a memory of the second sensor-display device 26. Any number of such convolved frames of data can be accumulated into the 3D convolution block, assuming sufficient memory capacity to store all of the pixel values for all of the convolved frames of data in the 3D convolution block. That 3D convolution block can be considered a first level in the neural network.

For the next convolution block or level, the first sensor-display device 14 and the second sensor display device 26 swap functions. The 3D convolution block in the memory of the second sensor-display device 26 becomes the frame of data for the next convolution sequence. For example, each accumulated convolved frame of data in the 3D convolution block in the memory of the second sensor-display device 26 is projected by the second sensor-display device 26 through a second Fourier transform lens 28 to the radial modulator device 20, where it is multiplied by a filter and reflected to the first sensor-display device 14. The first sensor-display device 14 detects and sums series of such convolved and summed frames of data to build the next 3D convolution block in the memory of the first sensor-display device 14.

Figure 5:
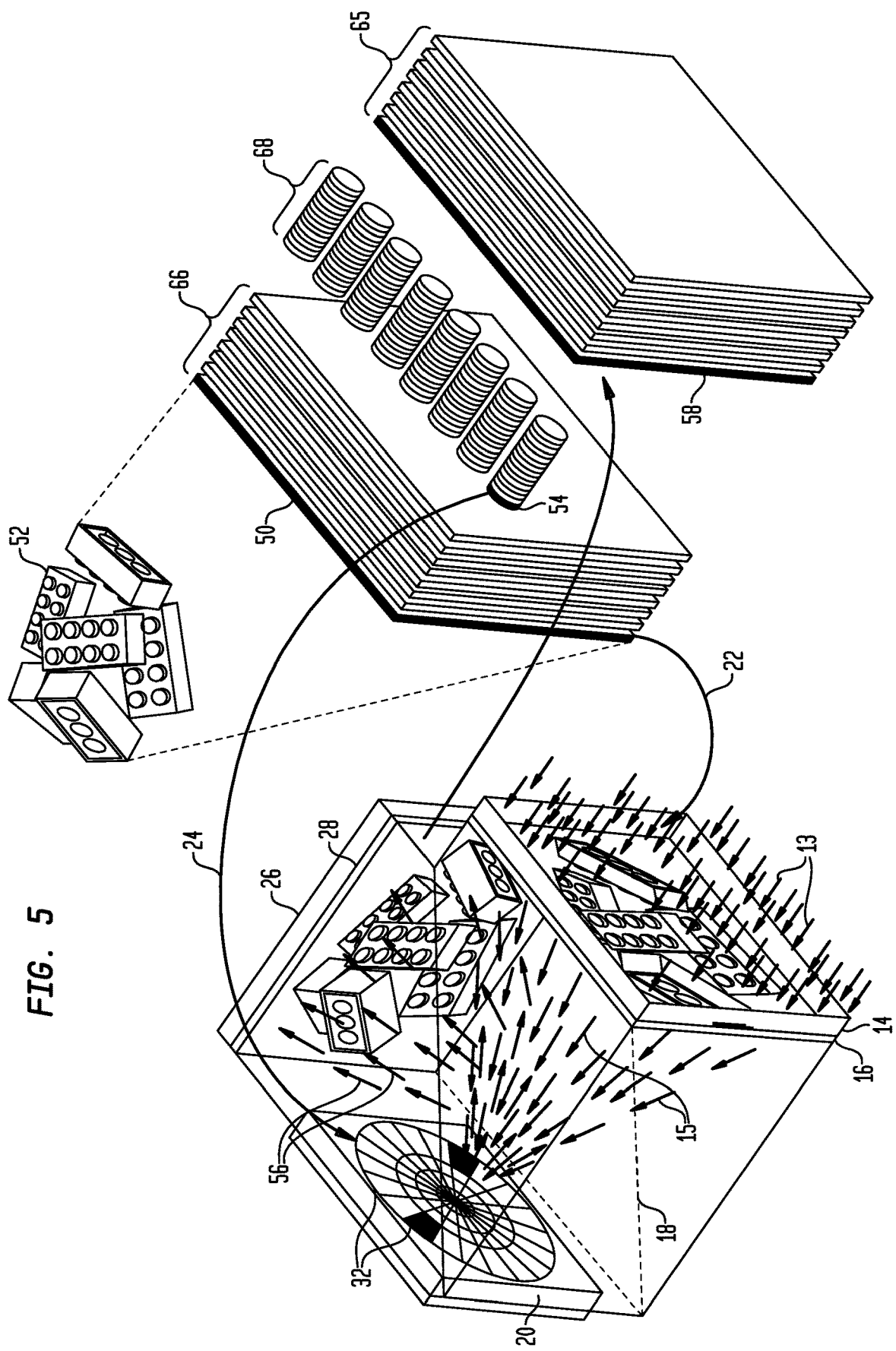
FIG. 5 is an isometric diagram illustrating convolution functions of an example photonic convolution assembly of the example photonic neural network system.

That process cycle is illustrated diagrammatically in FIG. 5.

Those convolution process cycles, i.e., projecting frames of data back and forth between the first sensor-display device 14 and the second sensor display device 26, can be repeated as many times as needed for any convolution neural network architecture. As more filters are applied in subsequent cycles, the convolutions can be pooled by feeding accumulated electric charges from multiple pixel detections into one memory cell instead of feeding accumulated electric charges from each pixel detection into an individual memory cell, as will be described in more detail below. Accordingly, convolutional neural networks with many levels of abstraction can be developed with the example photonic neural network 10.

Figure 3:
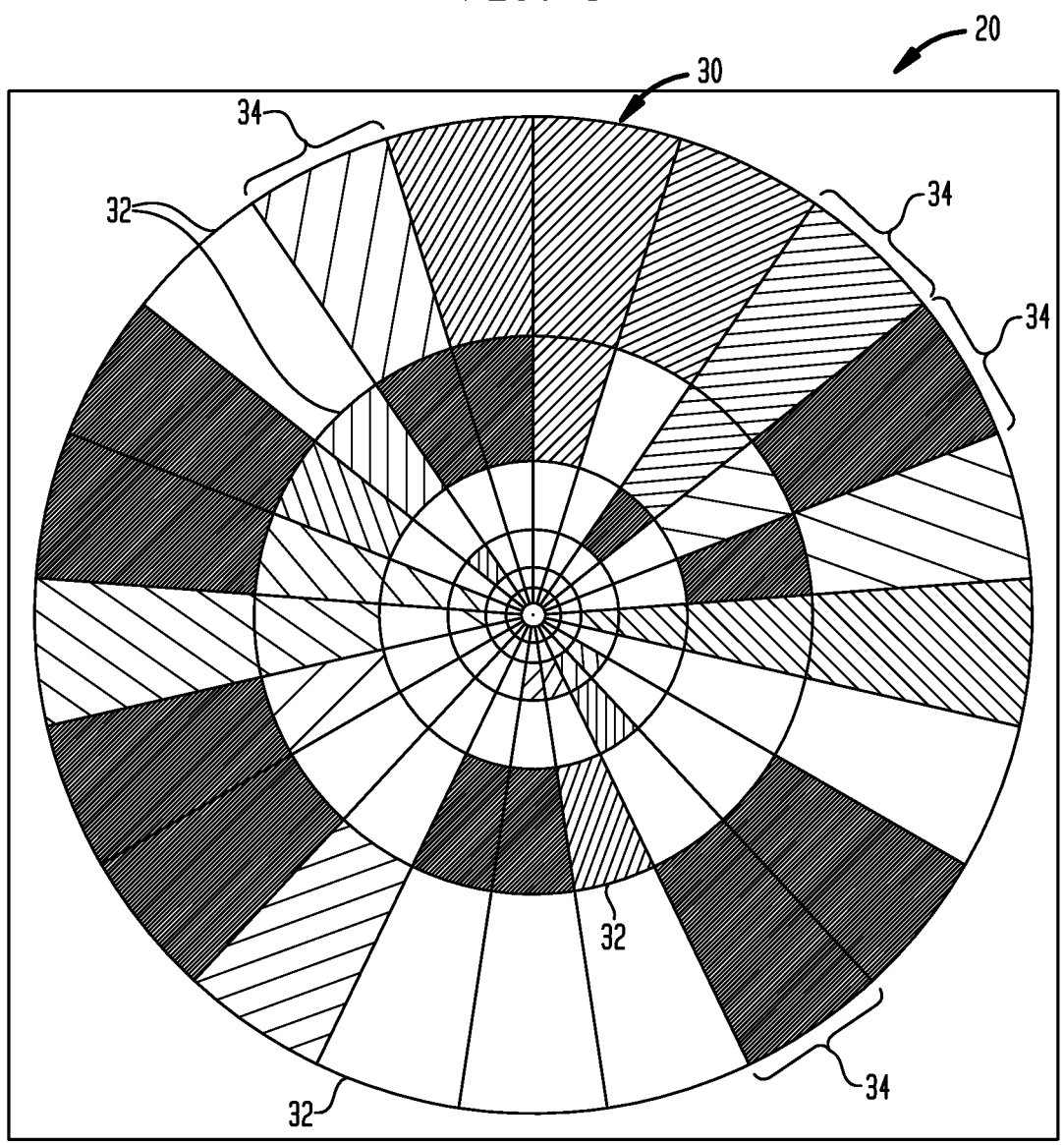
FIG. 3 is a front elevation view of an example radial modulator in the example photonic neural network in FIG. 1.
Figure 4:
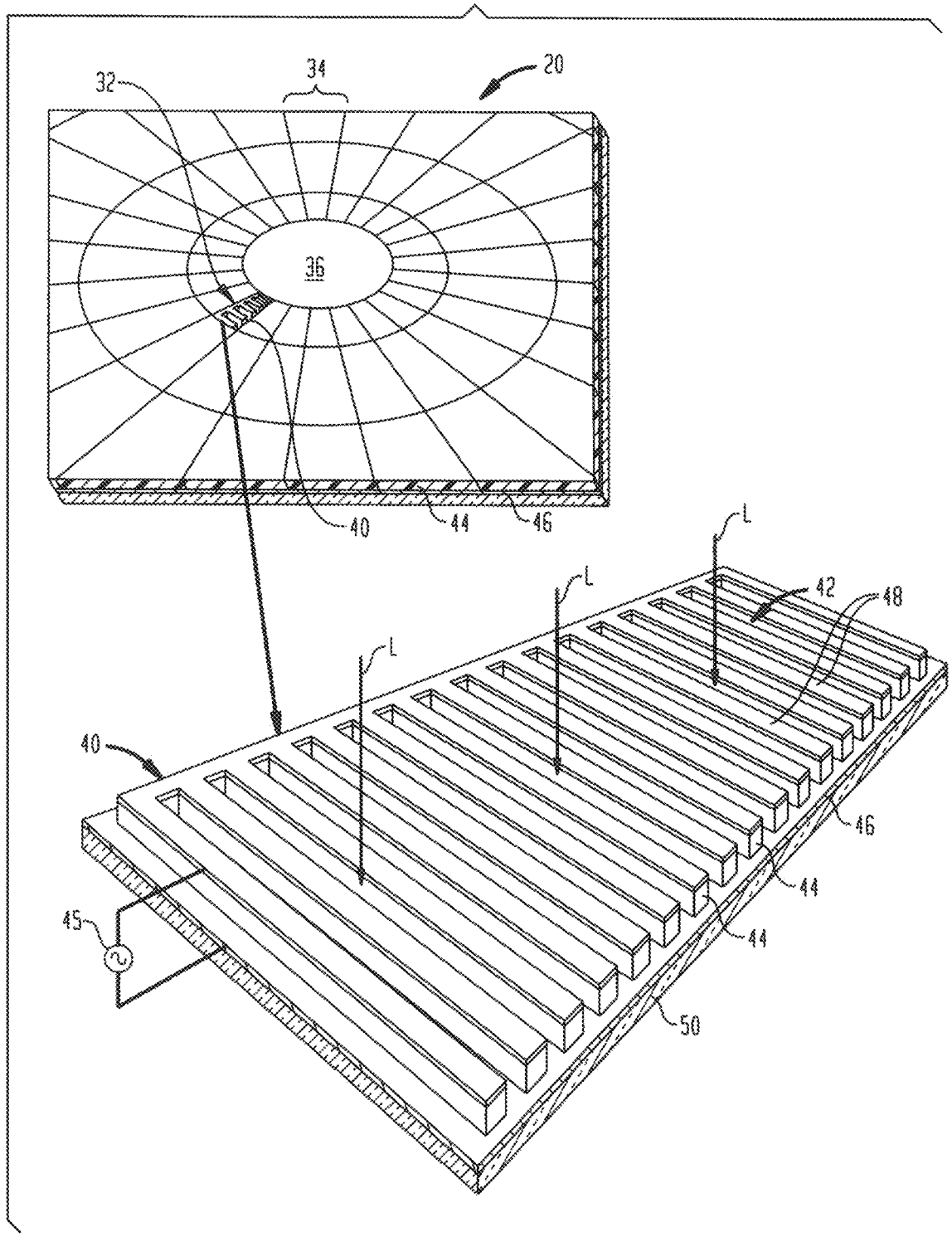
FIG. 4 is an isometric view of a center portion of the example radial modulator in FIG. 3 along with an enlarged view of an example light modulator segment of the radial modulator.

A front elevation view of an example radial modulator device 20 is shown in FIG. 3, and a perspective view of a center portion of the example radial modulator device 20 with an enlarged view of an example segment light modulator element 40 in the example radial modulator device 20 is shown in FIG. 4. The radial modulator device 20 has an optically active area 30 comprising a plurality of light modulating wedge-shaped segments 32 (wedge segments), each of which is independently actuatable to modulate light that is incident on the respective wedge segments 32. In the example radial modulator device 20 shown in FIGS. 2, 3, and 4, the wedge segments 32 are grouped into a plurality of wedge sectors 34, each of which extends radially outward from a center component 36, and which together form the optically active area 30 of the radial modulator device 20. In FIGS. 3 and 4, only some of the wedge segments 32 and sectors 34 are marked with those designations to avoid clutter in the drawings, but, with this illustration, persons skilled in the art will see and understand where all of the wedge segments 32 and wedge sectors 34 are located in the example radial modulator device 20. In the example radial modulator device 20 shown in FIGS. 3 and 4, the wedge segments 32 are arranged to form a circular optically active area 30, but other shapes could be used.

As explained above, each of the wedge segments 32 is optically active in the sense that each wedge segment 32 can be activated to transmit light, to block light, or to modulate transmission of light between full transmission and blocked. Therefore, a beam or field of light incident on the optically active area 30 can be modulated with any combination of one or more wedge segments 32. Spatial light modulators can be designed and constructed to modulate light in a number of ways. For example, U.S. Pat. No. 7,103,223 issued to Rikk Crill on Sep. 5, 2006, illustrates the use of birefringent liquid crystal material to modulate wedge segments in a radial spatial light modulator similar to the radial modulator device 20 in FIGS. 2 and 3. The article, Zhang, et al., "Active metasurface modulator with electro-optic polymer using bimodal plasmonic resonance," Optics Express, Vol. 25, No. 24, 17 Nov. 2017, describes an electrically tunable metal grating with an electro-optic polymer that modulates light and is suitable for ultra-thin surface-normal applications. Such a metasurface light modulator element is shown in FIG. 4 shaped for use as an example segment light modulator 40 comprising a metallic grating structure 42 for an optically active wedge segment 32 in the example radial modulator device 20. The grating structure 42 comprises an interdigitated electro-optic polymer 44 sandwiched between a bottom metal (e.g., Au) layer 46 and an interdigitated top thin metal (e.g., Au) grating layer 48, all built on a substrate 50. The grating 42, period is shorter than the wavelength of the incident light L so that diffraction is prohibited. The thickness of the top metal layer 48 is larger than skin depth to eliminate direct coupling from the incident light L into the electro-optic polymer 44. The bottom metal layer 46 is also the same thickness so that it operates as an almost perfect reflective mirror. Essentially, the light L enters the top of the metasurface light modulator element 40, is phase-shifted in the electro-optic polymer 44 which is periodically poled by application of a poling voltage 45, reflects off the bottom metal layer 46, is further phase-shifted during its second (i.e., reflected) pass, and exits the top surface with the polarization of the light rotated 90 degrees. The other wedge segments 32 in the example radial modulator device 20 can have the same kind of light modulator elements 40, but sized and shaped to fit and substantially fill each particular wedge segment 32. The center component 36 can also have a light modulator element 40.

The example radial modulator device 20 shown in FIGS. 2-7 and as described above is a reflective device, wherein incident light is modulated by the wedge segments 32 and reflected. However, the radial modulator could be a transmissive device instead, wherein incident light is modulated and transmitted through the radial modulator. Of course the positions of the optical components, e.g., sensor-display devices, lenses, and polarizers, would have to be re-arranged to route the light fields in the proper sequences to the respective optical components, but persons skilled in the art will know how to make such rearrangements after they become familiar with the example photonic neural network 10 described above.

As shown in FIGS. 3 and 4 and as explained briefly above, the optically active wedge segments 32 are grouped into a plurality of wedge sectors 34 that extend radially from the round center component 36 to the periphery of the optically active area 30. The wedge segments 32 are also arranged in concentric rings around the center component 36. Each concentric ring of wedge segments 32 other than the innermost concentric ring has an outer radius that is two times the outer radius of the immediately adjacent inner ring, which matches the scale distribution in a Fourier transform. Accordingly, each radially outward succeeding wedge segment 32 in a wedge sector 34 is twice as long as the immediately preceding wedge segment 32. A detailed explanation of how a radial modulator functioning as a filter on the Fourier transform plane of an image can be seen, for example, in U.S. Pat. No. 7,103,223 issued to Rikk Grill on Sep. 5, 2006. Suffice it to say here that light energy from higher spatial frequency shape content in a spatial domain is dispersed in the Fourier transform plane radially outward farther than light energy from lower spatial frequency content, while angular orientations and intensities of light energy from the lower spatial frequency content and from higher spatial frequency content are preserved in the Fourier transform of the image. Therefore, light energy transmitted by a particular wedge segment 32 positioned at a particular angular orientation and at a particular radial distance from the center (optical axis) of a Fourier transformed image in the Fourier transform plane will inverse Fourier transform in a projection back into the spatial domain to display only shape content (features) from the original image that have the same angular orientation as the particular wedge segment 32 and only shape content (features) in that angular orientation that have spatial frequency in a range that corresponds to the radial extent to which such light energy was dispersed in the Fourier transform plane. The light intensity (brightness) of those inverse-Fourier transformed features (shape content) back in the spatial domain will correspond to the light intensity (brightness) that those features (shape content) had in the original image, and they will be in the same location as they were in the original image. Of course, shape content (features) comprised in the light energy of the original image that gets blocked and not transmitted by a particular wedge segment 32 in the Fourier transform plane will be missing in the inverse-Fourier transformed image back in the spatial domain. Also, the shape content (features) comprised in light energy that is only partially blocked, thus partially transmitted, by a particular wedge segment 32 in the Fourier transform plane will inverse-Fourier transform back into the spatial domain with the same angular orientation and the particular spatial frequency as explained above, but with decreased intensity (brightness). Accordingly, as explained above and as will be explained in more detail below, that inverse-Fourier transformed image back in the spatial domain, with some of the shape content (features) of the original image preserved in the inverse-Fourier transformed image in full or partial intensity (brightness) and with some of the shape content (features) partially or completely deleted in the inverse-Fourier transformed image, is the convolution image that gets detected and used in the building of the 3D convolution block for the neural network as illustrated in FIG. 5.

Referring, therefore, to FIG. 5, a first filter 54 is loaded into the radial modulator device 20 via the data interface 24, which sets the wedge segments 32 to transmit light fully or partially or to block light in a pattern that is set by the first filter 54. A first frame of data 50 comprising, for example, an image of a pile of LEGO™ toy building blocks 52, is loaded into the first sensor-display device 14 via the data interface 22, so display components in the first sensor-display device 14 (not shown in FIG. 5) are set to display the frame of data comprising the image of the LEGO™ toy building blocks 52 as can be seen in FIG. 5. Laser illumination 13 is directed onto the first sensor display device 14, which essentially shines the frame of data 50 comprising the image of the LEGO™ toy building blocks through the first Fourier transform lens 16 and through the polarizer 18 to the radial modulator device 20, which is positioned in the Fourier transform plane at a focal distance F1 from the first Fourier transform lens 16, i.e., in the focal plane of the first Fourier transform lens 16, as also shown diagrammatically in FIG. 6. The Fourier transform lens 16 focuses the light field 15 comprising the image 50 to a focal point on the surface of the radial modulator device 20. The frame of data 50 comprising the image of the LEGO™ toy building blocks 52 is convolved with the filter by the wedge segments 32 of the radial modulator device 20 in the Fourier transform domain, which fully or partially reflects some light or blocks some light that comprised the image as explained above. The wedge segments 32 phase-shift, thus rotate polarization of, the reflected light, so that the light reflected by the radial modulator device 20 is reflected by the polarizer 18 to the second sensor-display device 26 as indicated by the reflected light field 56. Therefore, as explained above, some shape content (features) of the original frame of data 50 of the image of the LEGO™ toy building blocks 52 are missing or less intense, i.e., filtered out, in the convolved image that is incident on the second sensor-display device 26, as shown in FIG. 5. That convolved frame of data (image) is detected at the second sensor-display device 26 and summed in the second sensor-display device 26 with some number of subsequent convolved images to form a first convolved and summed data frame (image) 58. That first convolved and summed data frame (image) 58 can be transferred into a memory bank for accumulation with subsequent convolved and summed data frames (images) to build a 3D convolution block 65 as illustrated diagrammatically in FIG. 5.

The second sensor-display device 26 and the first sensor-display device 14 then swap roles as explained above, so that the second sensor-display device 26 goes into display mode, and the first sensor-display device 14 goes into sensor mode. With the second sensor-display device 26 in display mode, that first convolved and summed data frame (image) 58 is then projected by the second sensor-display device 26 back to the radial modulator device 20, as illustrated diagrammatically in FIG. 7, where it is convolved with additional filters, and then it is reflected by the radial modulator device 20 back to the first sensor-display device 14. This role swap is illustrated diagrammatically in FIG. 7, wherein the second sensor-display device 26 is switched to display mode, and the first sensor-display device 14 is switched to sensor mode. In the display mode, the display components of the second sensor-display device 26 are programmed to display that first convolved and summed data frame (image) 58. Accordingly, laser illumination 60 on the second sensor-display device 26 shines that first convolved and summed frame of data (image) 58 through the second Fourier transform lens 28 along the second optic axis 62 to the polarizer 18, which reflects the light field 64 along the first optic axis 61 to the radial modulator device 20. The optical distance between the second Fourier transform lens 28 and the radial modulator device 20 along the second optic axis 62 and the first optic axis 61 is equal to the focal length of the second Fourier transform lens 28, Therefore, the light field 64 at the radial modulator device 20 in the Fourier transform plane is the Fourier transform of the first convolved and summed data frame (image) 58. The radial modulator device 20 applies a filter to the Fourier transform of that first convolved and summed data frame to provide a second convolution to the data frame and reflects it with a phase shift, as explained above, to then propagate along the first optic axis 61 to the first sensor-display device 14. The first sensor-display device 14, now in the swapped role of a detector as explained above, detects the frame of data (image) as convolved by the filter applied by the radial modulator device 20. That convolved frame of data (image) detected by the first sensor-display device 14 is then summed by the first sensor-display device 14 with some number of other convolved frames of data (images) detected subsequently by the first sensor-detector device 14, and such convolved and summed frame of data (image) is transferred into a memory bank and used to build a second 3D convolution block 66, which is shown diagrammatically in FIG. 5.

The roles of the first and second sensor-display devices 14, 26 are then swapped again, and that convoluted and summed frame of data that was sensed and summed by the first sensor-display device 14 is then projected back through the system in the same manner as described above to be convolved by the radial modulator device 20 and then detected, and summed by the second sensor-display 26 to continue building the first 3D convolution block 65, and to be sent back through the system to be convolved with additional fitters and sums to continue building the second 3D convolution bank 66. That process is cycled as many times as desired to build deeper and deeper convolutions or until an inference neural network is complete.

The first sensor-display device 14 and the second sensor-display device 26 can each have a memory bank, as explained in more detail below, for storing the convolved frames of data (images) that it receives and sums with subsequently received convolved frames of data (images) to build the 3D convolution blocks 65, 66 and subsequent convolution blocks. Therefore, except for the first frame of data (image) loaded into the system, the input frames of data can always be resident in a memory bank of one of the sensor-display devices 14, 26 from the previous convolution cycle. A series of filters 68 are loaded into the radial modulator device 20 synchronously with the displays of frames of data (images) by the respective first and second sensor-display devices 14, 26 for convolutions of the frames of data (images) with the filters.

Except for having been calculated optically in the Fourier transform domain, the convolutions from this photonic neural network system 10 are the same as convolutions computed by traditional digital methods. However, full-frame parallelism at any resolution, as explained in more detail below, processed at the speed of light with an architecture where every data element is in its ideal location for the next convolution stage of a cycle is nearly 100 percent efficient, so building convolution blocks with the example photonic neural network system 10 as described above and in more detail below provides much more power and speed than convolutions computed by traditional digital methods.

Figure 8:
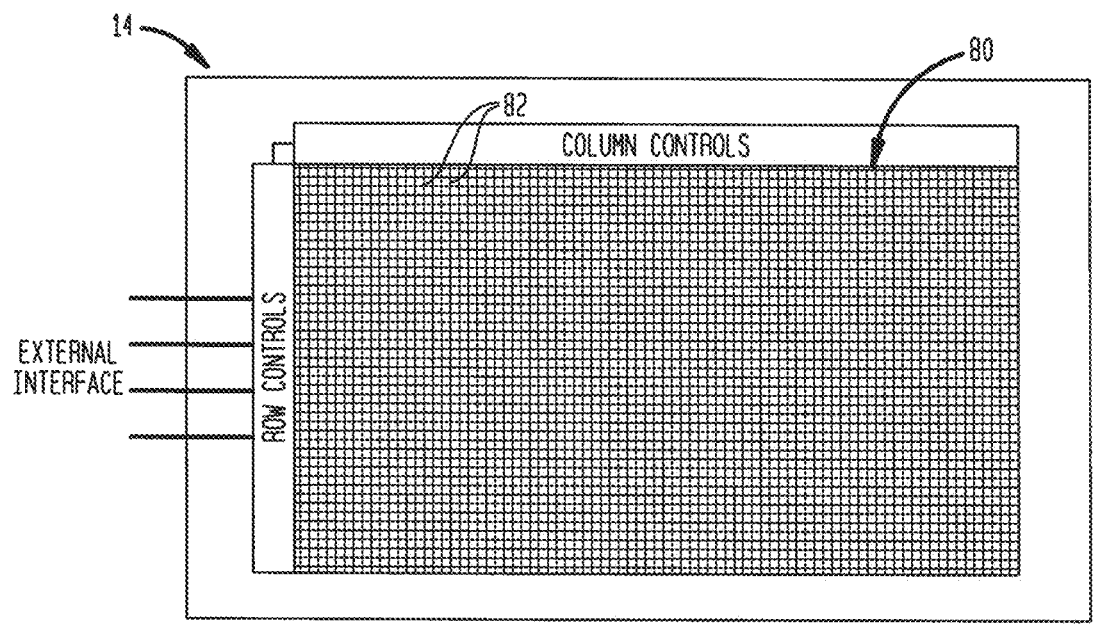
FIG. 8 is a function block diagram of the array of transmit-receive modules in the first sensor-display device.
Figure 9:
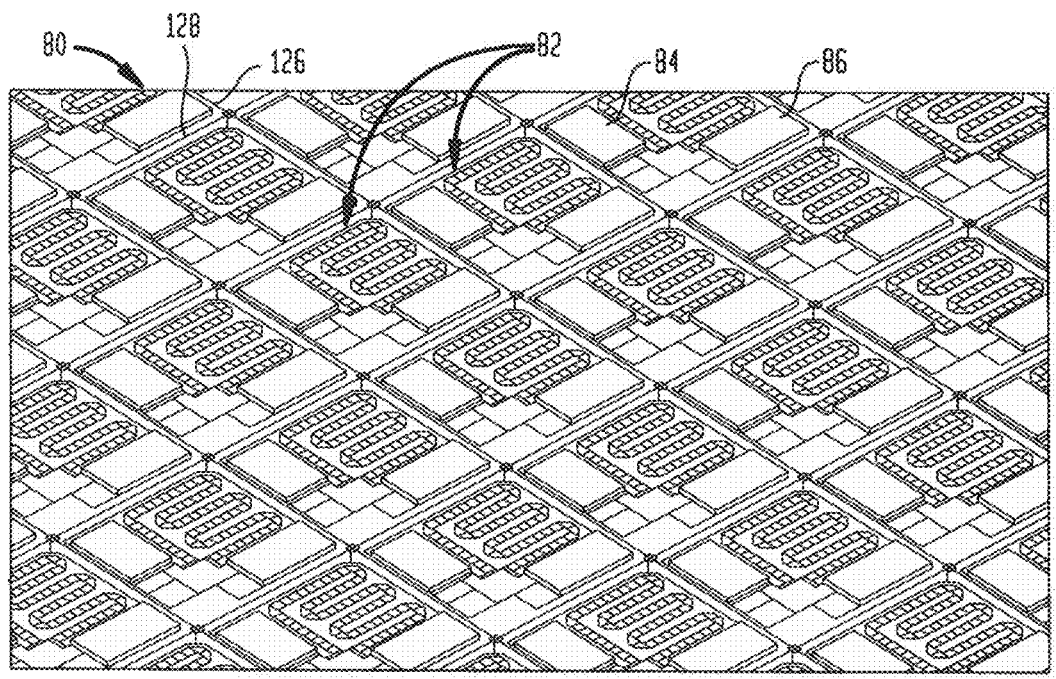
FIG. 9 is an enlarged isometric view of a portion of the array of transmit-receive modules.
Figure 10:
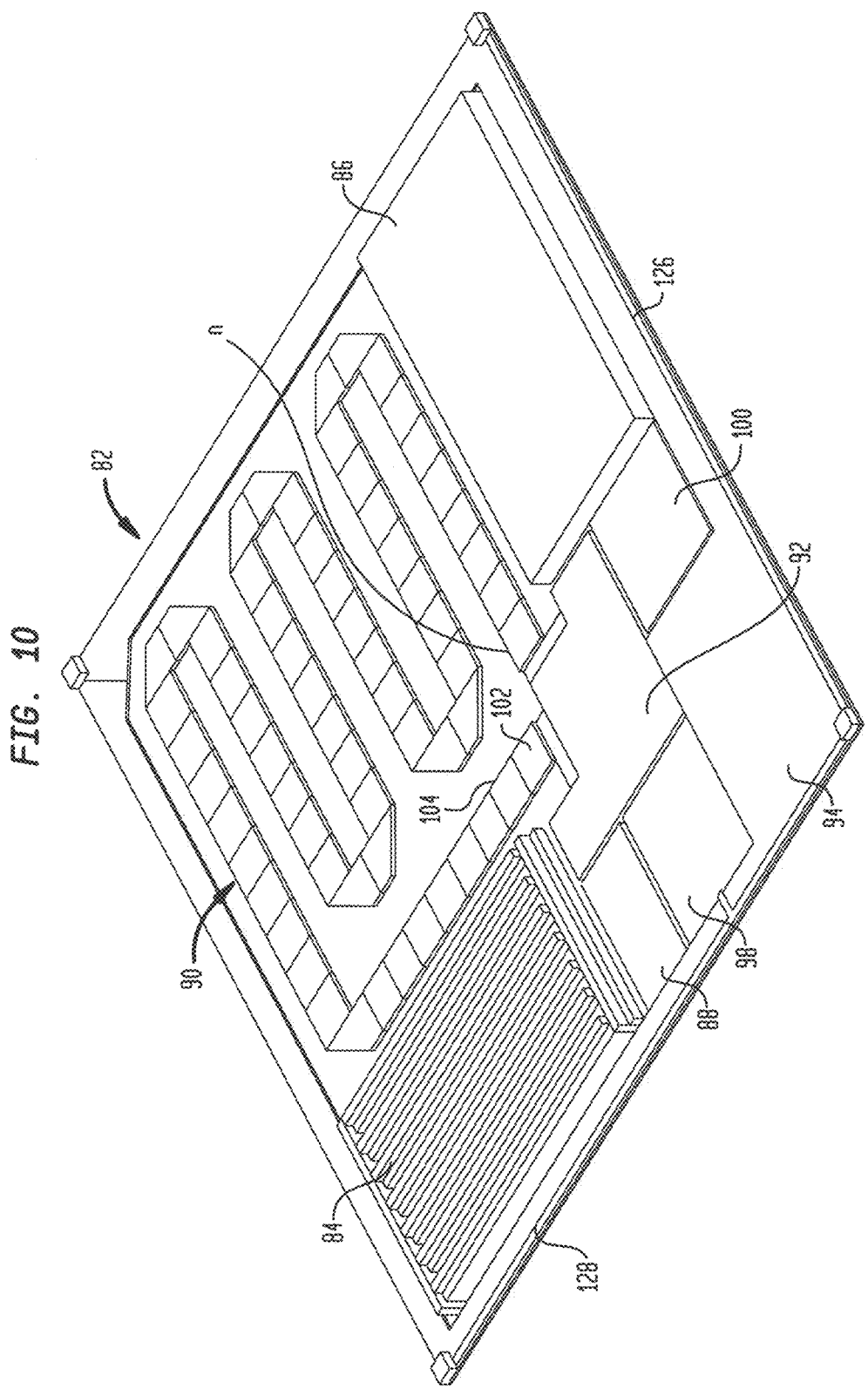
FIG. 10 is an enlarged isometric view of an example transmit-receive module.

As explained above, each of the first and second sensor-display devices 14, 26 has both light detection and image display capabilities on a pixel by pixel basis. In this example photonic neural network system 10, the first sensor-display device 14 and the second sensor display device 26 have essentially the same components and structures as each other, so the details of those devices are described below with reference primarily to the first sensor-display device 14, but understanding that such details are also representative of the second sensor-display device 26. Accordingly, the first sensor-display device 14 is sometimes called simply the sensor-display device 14 in the following description, A function block diagram of an example sensor-display device 14 is shown in FIG. 8 and comprises an array 80 of transmit-receive modules 82, each of which has light transmission and light detection elements and a memory bank as will be described in more detail below. Row and column controls for the transmit-receive modules 82 in the array 80, and a mixed analog and digital interface 24 to external control circuitry (not shown in FIG. 8) is provided for input and output data, which will be described in more detail below, An enlarged portion of the array 80 shown diagrammatically in FIG. 9 illustrates example transmit-receive modules 82 in the array 80, and a further enlarged diagrammatic representation of the example transmit-receive module 82 is shown in FIG. 10. Each of the example transmit-receive modules 82 comprises both a micro light transmitter element 84 and a micro light detector (sensor) element 86, which are small enough and in close enough proximity with each other for the transmit receive module 82 to function effectively as a transmitter of light and a receiver of light at substantially the same pixel location of an image or frame of data with sufficient resolution for operating a useful neural network, e.g., neural network results as at least as useful as neural network results from typical computational convolutions and processing with computer algorithms. For example, for neural network results with the example photonic neural network system 10 as useful as neural network results from typical computational convolutions and processing with computer algorithms, the micro light transmitter element 84 and the micro light detector element 86 may be offset from each other by not more than 40 micrometers and both fit within a transmit-receive module 82 that has an area not larger than 160 square micrometers.

Figure 6:
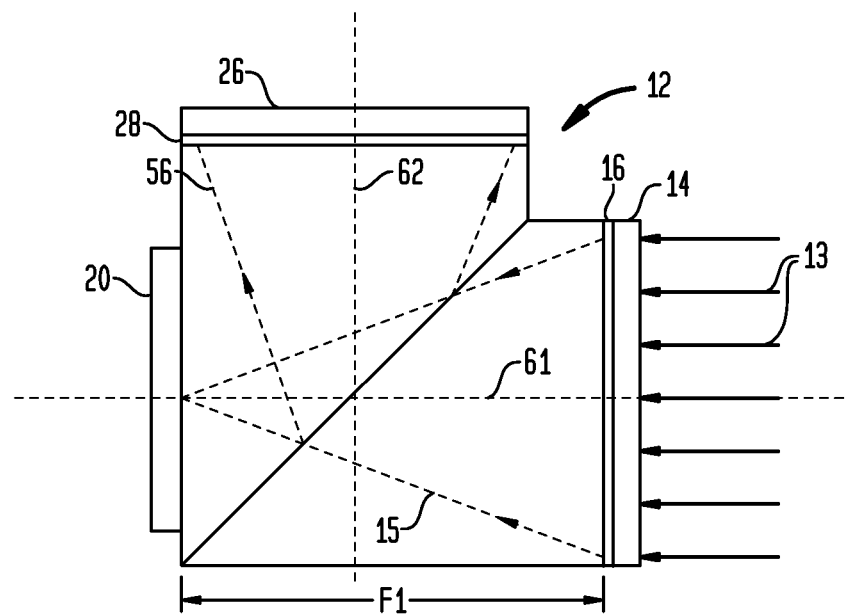
FIG. 6 is a diagrammatic top plan view of the example photonic convolution assembly in FIG. 2 illustrating the first sensor-display device displaying a frame of data (image) and the second sensor-display device sensing the convoluted frame of data.
Figure 7:
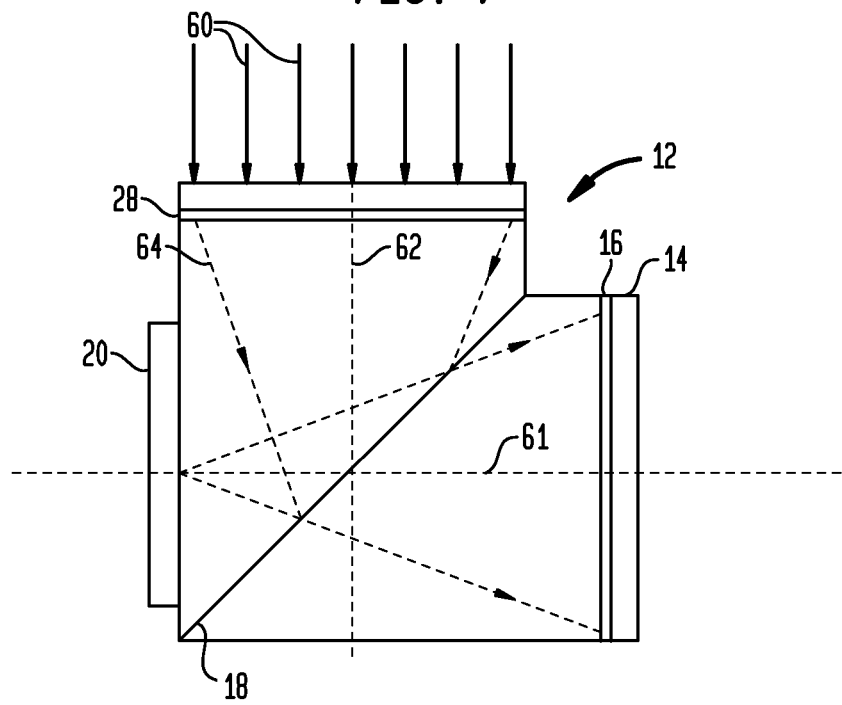
FIG. 7 is a diagrammatic top plan view of the example photonic convolution assembly in FIG. 2 illustrating the second sensor-display device displaying a frame of data (image) and the first sensor-display device sensing the convoluted frame of data.

As best seen in FIG. 10, in addition to the light transmitter element 84 and the light sensor or detector element 86, the example transmit-receive module 82 has a modulator driver 88, a memory bank 90, a memory interface 92, analog and digital control elements 94, pooling connections 96 for making pooling connections with adjacent transmit-receive modules 82 in the array 80, pooling control elements 98, and sense amplifiers 100. In the display mode, for example when the first sensor-display device 14 (FIGS. 2, 5, and 6) projects a frame of data (image) to the radial modulator 20 as explained above, laser illumination is directed onto the back of transmit-receive module 82 as shown in FIGS. 2, 5, and 6, The first frame of data (image) is comprised of pixel values for each pixel of the frame of data (image). Those pixel values are fed into respective transmit-receive modules 82 of the array 80 (FIGS. 8-10) in a pattern that will create the first frame of data (image) in the light field 15 of the laser illumination 13 (see FIGS. 2, 5, and 6), For an individual one of the transmit-receive modules 82 as shown in FIG. 10, the pixel value is fed into the analog and digital control elements 94, which shifts the pixel value to the modulation driver 88. The modulation driver 88 modulates voltage on the light transmitter element 84 (FIG. 10) according to the pixel value to modulate the laser illumination 13 (FIGS. 2, 5, and 6) that is incident on the light transmitter element 84 in a manner that transmits a pixel of the laser illumination at the same time that the other light transmitter elements 84 in the other transmit-receive modules 82 in the array 80 (FIGS. 8-10) are transmitting respective pixels of light, which together impose the frame of data (image) on the laser light field 15 (FIGS. 2, 5, and 6) that is transmitted through the array 80. After the first frame of data (image) is transmitted by the first sensor-display device 14 and a convolved frame of data (image) is directed back to that first sensor-display device 14, the light field comprising that convolved frame of data (image) is incident on the sensors 86 of all the transmit-receive modules 82 in the array 80 of the first sensor-display device 14. Accordingly, the sensor 86 on each transmit-receive module 82 in the array 80 detects a pixel of the incident light field, thus a pixel of the frame of date (image) comprised by the incident light field. Persons skilled in the art understand how light sensors, for example, charge-coupled devices (CCDs), are structured and function, and such light sensors or similar light sensors can be used for the sensors 86. Essentially, each light sensor has a light-sensing photodiode or capacitive component that responds to incident photons of light by absorbing much of the energy in the photons and creating an electric charge proportional to the incident light intensity and accumulating the electric Charge in the capacitive component. The longer the light is incident on the sensor, the more electric charge is accumulated in the capacitive component. Accordingly, the pixel of light energy incident on each sensor 86 causes an electric charge to build in that sensor 86, and the magnitude of the electric charge is proportional to the intensity of the incident light in that pixel and the time that the light in that pixel is incident on the sensor 86.

As explained above, if a series of convolved frames of data (images) are transmitted to, and received by, the sensor display device 14, the light energy (photons) of the sequential light fields comprising the sequential frames of data (images) cause electric charges in the sensors 86, so sequential pixels of the light field energy from the sequential light fields sensed by an individual sensor 86 can be accumulated, i.e., added, to the capacitive component of that individual sensor 86, thereby resulting in an accumulated electric charge in the sensor 86 that is the sum of the light energy from the sequence of light fields at that particular pixel location. Accordingly, a sequence of convolved frames of data (images) received by the sensor-display device 14 are sensed and summed on a pixel-by-pixel basis by the array 80 of transmit-receive modules 82 of the sensor-display device 14. Then, when the prescribed number of individual convolved frames of data (images) have been received and summed as explained above, the accumulated (summed) charge in the sensor 86 of each individual transmit-receive module 82 is shifted into the memory bank 90 of that individual transmit-receive module 82. The same operation of shifting the accumulated (summed) charges in the sensors 86 into the memory banks 90 occurs in all of the transmit-receive modules 82 in the array 80 simultaneously. Accordingly, upon execution of that shift operation, the array 80 of transmit-receive modules 82 has stored in the individual memory banks 90 of the transmit-receive modules 82 the complete convolved and summed frame of data (image) that results from the convolution and summing of that series or sequence of convolutions of input frames of data (images). With reference to FIG. 10, the pixel value for that first convolved and summed frame of data (image) at the pixel location of that particular transmit-receive module 82 is shifted from the sensor 86 into the first memory cell 102. Therefore, the composite of all the first memory cells 102 in the memory banks 90 of all the transmit-receive modules 82 of the array 80 comprise the convolved and summed frame of data (image) on a pixel-by-pixel basis.

Then, as a subsequent, second, series or sequence of frames of data (images) are convolved and summed as described above, the accumulated electric charge in the sensor 86 for that pixel of the resulting second convolved and summed frame of data (image) is shifted into the first memory cell 102 as the charge from that pixel of the first convolved and summed frame of data (image) is simultaneously shifted to the second memory cell 104 of the memory 90. Persons skilled in the art understand how such shift register memories are made and operated, so a detailed description is not necessary for purposes of this explanation. That same process occurs simultaneously in the other transmit receive modules 82 in the array 80. Therefore, the composite of all the first and second memory cells 102, 104 in the memory banks 90 of all the transmit-receive modules 82 of the array 80 comprise the first and second convolved and summed frames of data (images) on a pixel-by-pixel basis.

As more and more subsequent series or sequences of frames of data (images) are convolved and summed as described above, the summed pixel values of such sequential convolved and summed frames of data (images) are shifted in sequence into the first memory cell 102 while each preceding pixel value is shifted farther along in the memory cells of the memory bank 90, and that process occurs simultaneously in all of the transmit-receive modules 82 of the array 80 as explained above. Therefore, all of such convolved and summed frames of data (images) from all of the series or sequences of convolutions and summing are stored on a pixel-by-pixel basis in the memory cells of the memory banks 90 in the array 80 of transmit-receive modules 82. Each of such convolved and summed frames of data (images) is sometimes called a convolution, so the array 80 of transmit-receive modules 82 can hold as many convolutions on a pixel-by-pixel basis as there are individual memory cells in the individual memory banks 90 of the transmit-receive modules 82, For example, the example transmit-receive modules 82 illustrated diagrammatically in FIGS. 9 and 10 each have a memory bank 90 comprised of 64 individual memory cells 102, 104, . . . , n. Therefore, the example array 80 of transmit-receive modules 82 can hold as many as 64 convolutions of frames of data (images) on a full-resolution pixel-by-pixel basis. When the light transmitter elements 84 and light sensor elements 86 in the transmit-receive modules 82 (see FIG. 1) are pooled together with the light transmitter elements 84 and light sensor elements 86 of adjacent transmit-receive modules 82, as described in more detail below, all of the light transmitter elements 84 and light sensor elements 86 in the pooled group display the same brightness for a coarser representation of the frames of data (images). Under such pooling conditions, the memory banks 90 of the transmit-receive modules 82 in the pooled group can be used sequentially to save the sensed and summed results for the whole pooled group of transmit-receive modules 82 and thereby increasing the effective memory capacity and depth. For example, if the transmit-receive modules 82, each having a memory bank 90 comprising 64 memory cells, are pooled in 5×5 groups, i.e., twenty-five transmit-receive modules 82 per group, the effective memory capacity or depth of each group is 1,600 memory cells (64×25=1,600). Therefore, sequential convoluted and summed frames of data (images) can be fed first into one of the transmit-receive modules 82 in the group until the memory bank 90 of that transmit-receive module 82 is filled, and then more sequential convoluted and summed frames of data (images) can be fed into a second transmit-receive module 82 in the group until the memory bank 90 of that second transmit-receive device 82 is also filled, and then continuing to fill sequentially the respective memory banks 90 of the rest of transmit-receive modules 82 in the group. If the memory banks 90 of all of the transmit-receive modules 82 in the group are filled, that block of convolutions in memory would be 1,600 deep. The aggregation of convolutions in the memories 90 of the transmit-receive modules 82 in the array 80 together are a convolution block, for example, the 3D convolution block 65 illustrated diagrammatically in FIG. 5. When a desired number of such convolutions are accumulated in the array for the last 3D convolution block, they can be read out of the memory banks 90 on a pixel-by-pixel basis for transmission by the sensor-display device 14 back through the electronic data interface 22 at the end of the process to output the neural network result.

It is important to reiterate, however, that during the deep learning process of repeatedly further convolving and summing frames of data with the example photonic neural network system 10, the pixel values for the most recently formed convolution block are still resident in the memory cells of the individual memory banks 90 in the individual transmit-receive modules 82. Therefore, when the sensor-display device 14 is switched from the sensor mode, in which the convolution block is accumulated in the memories 90 of the transmit-receive modules 82, to the display mode, in which that convolution block is transmitted back through the optical components of the system 10 for deeper convolution processing, the pixel values for each of the convolved and summed frames of data (images) that comprise the convolution block can be read (shifted) directly from the memory cells 102, 104, . . . , n of the memory 90 to the modulator driver 88 without any further processing and transferring of the data into or out of external computer processing, memories, and other components or functions. Instead, upon switching from the sensor mode to the display mode, the pixels values of the individual frames of data (images) that comprise the convolution block are read (shifted) sequentially from the memory 90 directly to the modulation driver 88, which drives the light transmitter element 84 to modulate the laser light that is incident on the transmit-receive module 82 in a manner that writes (imposes) the pixel value of the frame of data (image), which is to be further convolved in that convolution cycle, into the light field. Accordingly, as all of the transmit-receive modules 82 in the array 80 are switched simultaneously to the display mode and the pixel values in each of them are written (imposed) into the laser light field, the composite of those pixel values in the light field transmitted by the sensor-display device 14 duplicate that previously convolved frame of data (image) that was summed and stored in the memory banks 90 of the transmit-receive modules 82 in the array 80. The light field comprising that previously convolved and summed frame of data (image) is then projected through the Fourier transform lens 16 to the radial modulator 20 for further convolution with a filter in the Fourier transform plane and is then detected at the other (e.g., second) sensor-display device 26 as explained above.

As also explained above, those convolution and summing processes are repeated over and over through many cycles with many filters. Also, the first sensor-display device 14 and the second sensor-display device are aligned on their respective optic axes 61, 62 (see FIGS. 2, 6, and 7) in such a manner that the transmit-receive modules 82 in the first sensor-display device 14 align optically with corresponding transmit-receive modules 82 in the second sensor-display device 26, so that there is complete optical registration between the respective arrays 80 of the first and second sensor-display devices 14, 26, including between corresponding transmit-receive modules. Therefore, the example photonic neural network 10 performs full-frame, full-resolution, fully-parallel convolution at the speed of light. Other effects such as gain, thresholds (ReLU), max or mean pooling, and other functions are performed simultaneously with dedicated circuitry, as will be described in more detail below, and those effects represent no additional time delay. Virtually any convolutional neural network architecture, including, for example, VGG16 or Inception-Resnet-v2, can be accommodated. All processing is done completely on the sensor-display devices 14, 26 with no relocation of frames of data (images) into and out of those devices. In inference operation, a user application only has to load the image and accept the results a few microseconds later.

The micro light transmitter elements 84 in the transmit-receive modules 82 can be any light modulator device that emits or modulates light. The description of the example photonic neural net system 10 described above includes light transmitter elements 84 that modulate laser light that is incident on the backs of the light transmitter elements by allowing or inhibiting the light from being transmitted through the light transmitter elements. However, the light transmitter elements 84 could be replaced with reflective light modulator devices that modulate incident light and reflect it, which would require the laser illumination to be incident on the same surface of the light transmitter elements from which the light is reflected and would require a re-arrangement of the optical elements as would be understood by persons skilled in the art once they come to understand the example photonic neural network described above. As another alternative, the light transmitter elements 84 could be replaced by light emitters, which would eliminate the need for the laser light field shining on the back and through the modulator.

Figure 11:
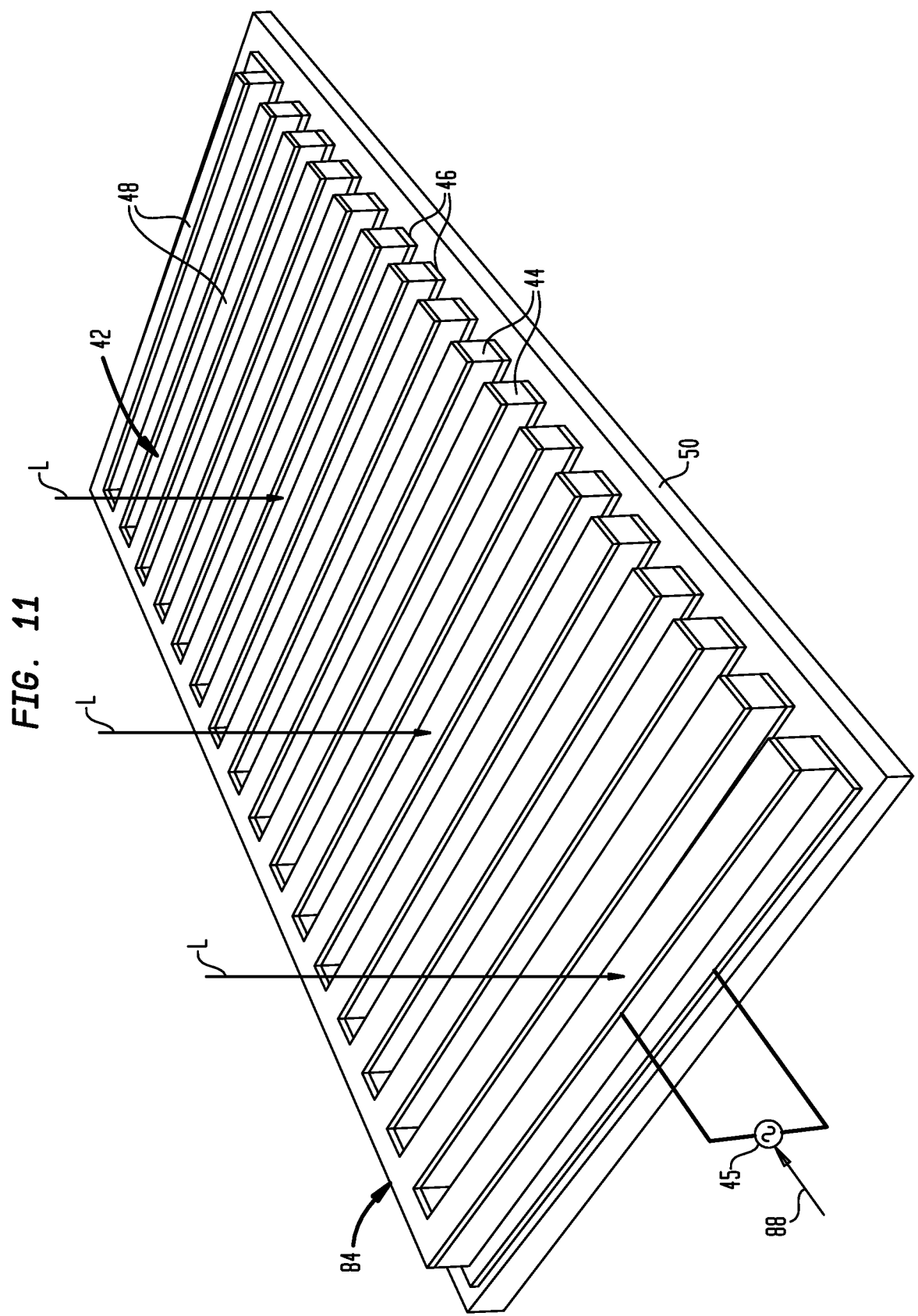
FIG. 11 is a perspective view of an example light transmitter element of the example transmit-receive module in FIGS. 9 and 10.

One example light transmitter element 84 is shown in FIG. 11, which modulates phase of incident light similar to the metasurface light modulator element 40 shown in FIG. 4 and described above. However, since this example light transmitter element 84 in FIG. 11 is a light transmissive element instead of the light reflective element in FIG. 4, the bottom metal layer 46 is voided between the grating structures to be interdigitated like the top electrode 48 so that incident light L is phase-modulated by the electro-optic polymer 44 to be either blocked by the electro-optic polymer 44 or allowed to pass through the grating structure 42. The substrate 50 is transparent to the light L. The poling voltage 45 is driven by the modulator driver 88 of the transmit-receive module 82 according to the pixel value that is to be imposed in the light field L as explained above. More details of such a transmissive light modulator can be seen in the article, Kosugi et al., "Surface-normal electro-optic-polymer modulator with silicon subwavelength grating," IEICE Electronics Express, Vol. 13, No. 17, 1-9, Sep. 10, 2016.

The back side of the transmit-receiver module 82 has an opaque covering or mask (not shown) covering the back surface to block the laser illumination on the back of the transmit-receive module 82 from being transmitted through the transmit-receive module 82 except for an aperture that allows the light to reach and pass through the light transmitter element 84. The optical components, including the Fourier transform lens 16 and a fiber faceplate to collimate the light in front of the Fourier transform lens 16 can be bonded to the front of the first sensor-display device 14. Likewise, the Fourier transform lens 28 and a fiber faceplate can be bonded to the front of the second sensor-display device 26.

With reference now to FIG. 1, in addition to the first and second sensor-display devices 14, 26 and the radial modulator device 20 of the photonic convolution assembly 12, the example photonic neural network system 10 also includes external control components, including, for example: (i) a circuit block 110 that implements pulse outputs to drive the radial modulator device 20; (ii) a high speed analog-digital circuit block. 112 through which digital data is loaded to and received from the first and second sensor-display devices 14, 26; a high bandwidth memory (HBM2) 114, and a field-programmable gate array (FPGA) 116, which is the basic control and interface device for the other system components. The HBM2 114 provides storage for filters, state-machine steps, and image data. The circuit block 110, HBM2 114, and FPGA 116 are on a multi-chip module (MCM) 118, and user interface to the system 10 is nominally through a PCI-Express bus 120.

Figure 12:
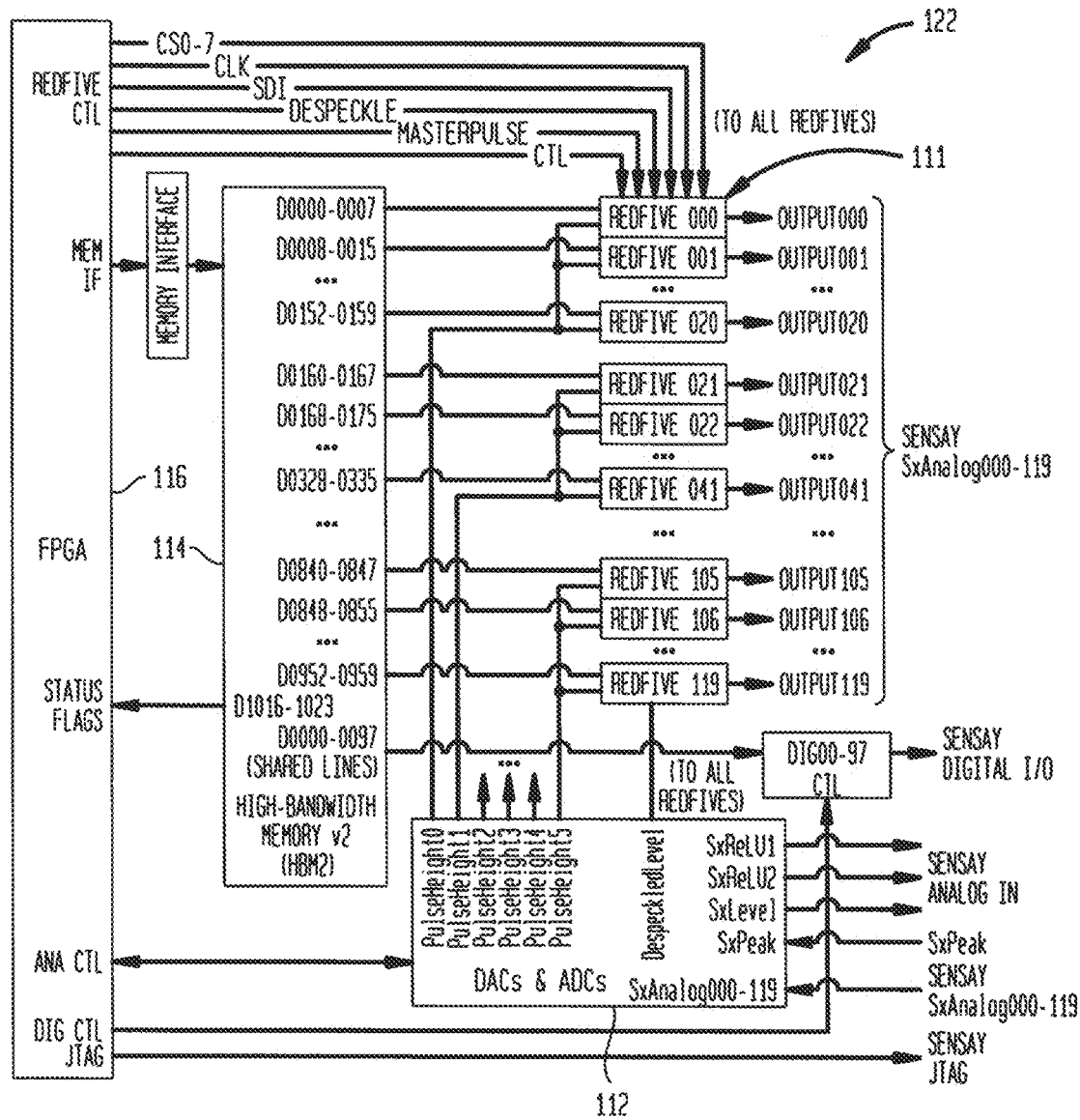
FIG. 12 is a function block diagram of an example system interface to the external interface of the sensor-display device.

A function block diagram of an example system interface 122 between the field programmable gate array (FPGA) 116 and the first sensor-display device 14 is shown in FIG. 12. The function block diagram in FIG. 12 is also representative of the system interface between the FPGA 116 and the second sensor-display device 26. For convenience and conciseness in the drawings, an arbitrary term "RedFive" is sometimes used in the drawings and the associated description for output circuit devices 111 of the circuit block 110 (FIG. 1), and the arbitrary term "Sensay" (a contraction of sensor and display) is sometimes used for sensor-display devices 14, 26 (FIGS. 1, 2, 5-7, and 10), Also for convenience and conciseness, the transmit-receive modules 82 (FIGS. 8-10) are sometimes referred to as "trixels." ("Trixel" is a contraction of "transmit-receive pixel.")

Some of the RedFives 111 serve to generate analog data to load the Sensay memory banks 90. These RedFives 111 are interfaced through the memory module (HBM2) 114, since the HBM2 114 is the state machine source managed by the FPGA 116. The analog and digital input/output (I/O) are interfaced through the FPGA 116, since it is used to control the feedback loops. Some unused bits are wrapped back to the FPGA 116 as status flags for synchronization. The Sensay Digital 14, 26 I/O uses the same memory lines as some of the RedFives 111, but they are not accessed simultaneously, so this dual use of the memory lines is not a conflict. Also, some of the outgoing analog lines from the RedFives 111 are shared as the incoming analog lines to the ADCs 112. The number of ADCs 112 used to read data and to pass it to the FPGA 116 is implementation dependent.

Figure 13:
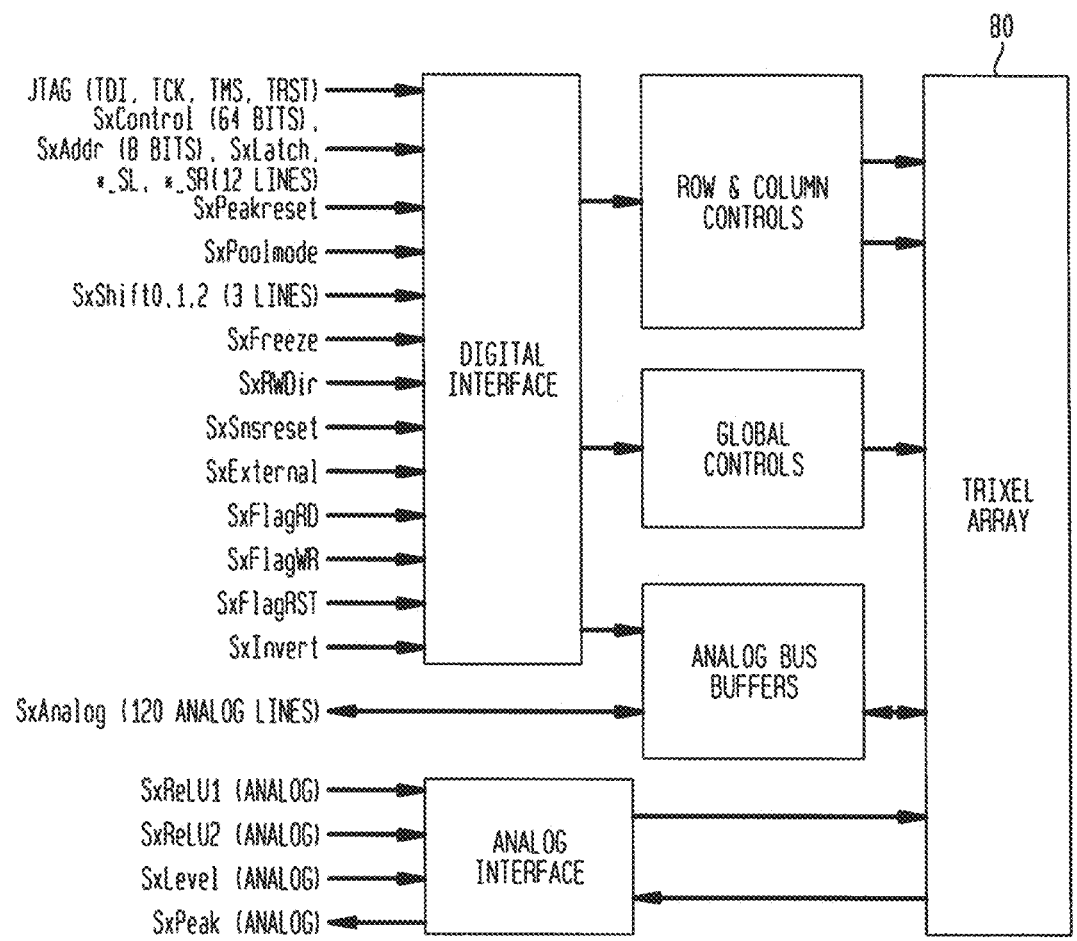
FIG. 13 is a function block diagram of an example external interface of a sensor-display device.

A function block diagram of the sensor-display device (Sensay) 14, 26 external interface see. FIG. 8) is shown in FIG. 13, In FIG. 13, an "Sx" is used for "SensayA" 14 or "SensayB" 26 prepended (when discussing the system to differentiate between signals associated with either Sensay 14, 26, The digital input lines in FIG. 8 can be grouped into three general categories. The Row and Column Controls load a set of latches in the Sensay (see FIG. 14). The Global Control lines have various functions, each of which will be described in context of usage. Global lines can be routed along either rows or columns. The Global control lines route to all transmit-receive modules (trixels) 82 and are not unique to particular columns or rows.

SxPeakreset resets the analog peak-hold circuit used for external gain controls. This signal is asynchronous, but to avoid data contention should only be asserted (1) when SxFreeze is asserted.

SxSnsreset in FIG. 13 resets the sensors 86 (FIG. 10) to the level of the analog SxLevel line. The Sensors 86 are designed to accumulate charge, so they need this mechanism to drop to a preset level. Note that this reset can be used as a global bias to preset the Sensor 86 charge levels (and, hence, the modulator level on the next pass).

SxPoolmode determines mean (1) or max (0) operation in pooling.

SxFreeze in FIG. 13 enables and disables global memory banks 90 (FIG. 10) access. If it is asserted (1) then all trixel memory drives 92 are set to the safe state and no memory bank 90 accesses or shifts are allowed. SxFreeze is used when configuring the other control lines to prevent contamination of the data before the lines are settled. In the following explanations the function of SxFreeze is not always mentioned, but its action always rules.

SxRWDir in FIG. 13 determines whether an enabled memory bank 90 (FIG. 10) is read or written. If set to "1," data is written to memory bank 90, and if "0" data is read from memory bank 90. It also gates the operation of the sensor (light detector element) 86 and modulator (light transmitter element) 84. It represents modulator mode (0) or sensor mode (1).

SxFlagRD, SxFlagWR and SxFlagRST control the digital flag memory used for semantic labeling. SxFlagRST is the global address reset for all flag memories. SxFlagRD and SxFlagWR control memory access.

SxShift0,1,2 are externally driven in a three-phase sequence to move the shift-register memory 90 charges in either a clockwise or a counter-clockwise direction only at addressed trixels (transmit-receive modules) 82. If a trixel is unaddressed, its memory drive lines are forced to a safe state and memory charges are unaffected.

SxExternal determines whether the SxAnalog and SxData lines are active (1) or data movement and access is solely internal (0).

Consider Four Combinations of These Signals:

Image Load: SxFreeze=0, SxRWDir=1, SxExternal=1. This means that any memory cell at addressed trixels 82 will take data from external SxAnalog lines and place the voltages in the trixel memory bank(s) 90 via internal SxData lines. Since there are 120 SxAnalog lines, this action can be up to 120-wide. For implementations where a 120-wide set of DACs is not appropriate, the lines can be externally connected in groups, and narrower accesses can be accommodated simply by enabling MEMR lines in sequence. Regardless of the implemented external row width, to avoid contention typically only one MEMC line at a time is enabled (although the same DAC value could be sent to an entire row at once if desired).

Result Save: SxFreeze=0, SxRWDir=0, SxExternal=1. This means that any memory cell at addressed trixels 82 will send data to external SxAnalog lines for conversion with external ADCs. Again, this can be up to 128-wide but narrower implementations can be accommodated without design changes to Sensay. Regardless of the implemented external row width, to avoid contention only one MEMC is enabled at a time (this is not optional on Read to avoid data contention).

Sensor Mode: SxFreeze=0, SxRWDir=1, SxExternal=0. This means that any memory cell at addressed trixels 82 will take data from the sensors 86 (via the pooling chain, which will be described below, and, in conjunction with SxShift0, 1,2, save the voltage as a new memory charge while shifting the existing voltages as a shift register set of memory values.

Modulator Mode: SxFreeze=0, SxRWDir=0, SxExternal=0. This means that any memory cell at addressed trixels 82 will send data to the modulators (light transmitter elements) 84 (via the pooling chain) and, in conjunction with SxShift0,1,2, shift the existing voltages as a shift register set of memory charges. Memory reads are non-destructive.

Figure 14:
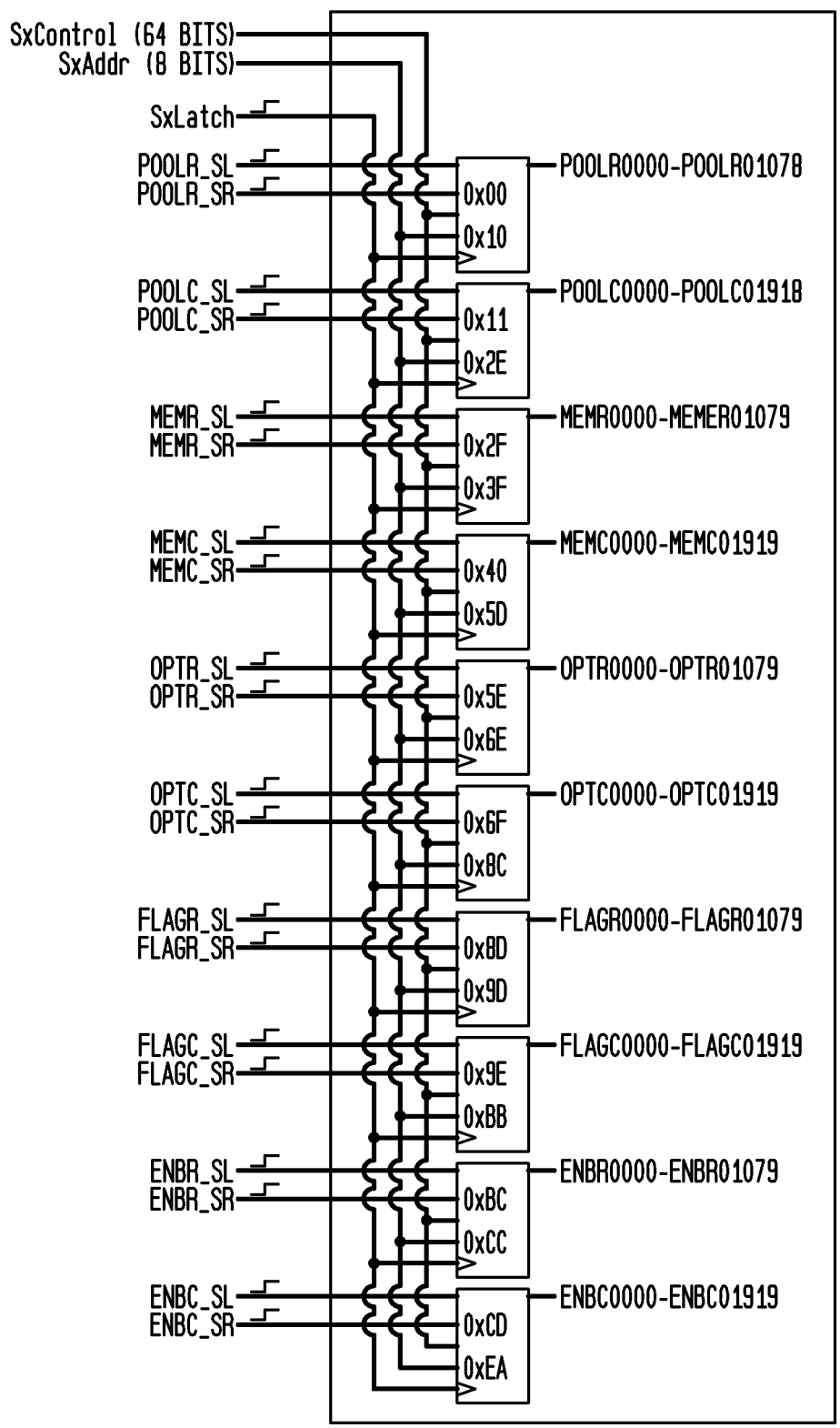
FIG. 14 is a schematic diagram of row and column control line registers for the array of transmit-receive modules.

Example row and column control line registers for a trixel (transmit-receive module) 82 are shown schematically in FIG. 14. In this example, row and column control line registers comprise 235 individually addressed static 64-bit latches arranged as five row and five column lines per trixel. These outputs are always active and are zeroed on power-up. These row and column control lines used by each trixel 82 to configure itself for its function in relation to its neighbors. Each of the latches is individually addressed by asserting the data at SxControl, setting the 8-bit address at SxAddr and pulsing SxLatch.

A trixel's memory 90 is said to be "addressed" when its MEMR and MEMC are both asserted. Similarly, its optical sensor is "addressed" when its OPTC and OPTR are both asserted. Miscellaneous trixel 82 functions are disabled when its ENBR and ENBC are deasserted. To completely disable a trixel 82, deassert its MEMR, MEMC, OPTR, OPTC, FLAGR and FLAGC as well.

Pooling border lines 86 (POOLC and POOLR) affect whole columns and rows of trixels 82 and define the boundaries of super trixels as will be described in more detail below. The rightmost and bottommost lines are always enabled, so there are only 1079 POOLR and 1919 POOLC lines. Unused lines in the 64-bit latches are not connected.

The*_SL and *_SR lines shift their respective registers left or right on a rising edge.

SxReLU1 and SxReLU2 (FIG. 13) are driven by external DACs. They are global to all trixels 82 and applied the sensor 86 read values to eliminate weak information. SxLevel (FIG. 13) is also driven by an external DAC. It is used by all trixel sensors 86 as a preset level and is also summed into the modulator drive 88 level, where it is used as a phase offset. Since a sensay (sensor-display device) 14 or 26 is either in sensor or modulator (transmit) mode at any moment, as explained above, there is no contention. The SxPeak (FIG. 13) analog output signal is a signal from all trixels (transmit-receive modules) 82. As described in more detail below, each trixel memory cell passes its highest value to a common trace. The value of this trace represents the highest global value seen by the whole trixel array since SxPeakreset was last asserted. This is used by external circuitry for system gain and normalization.

Figure 15:
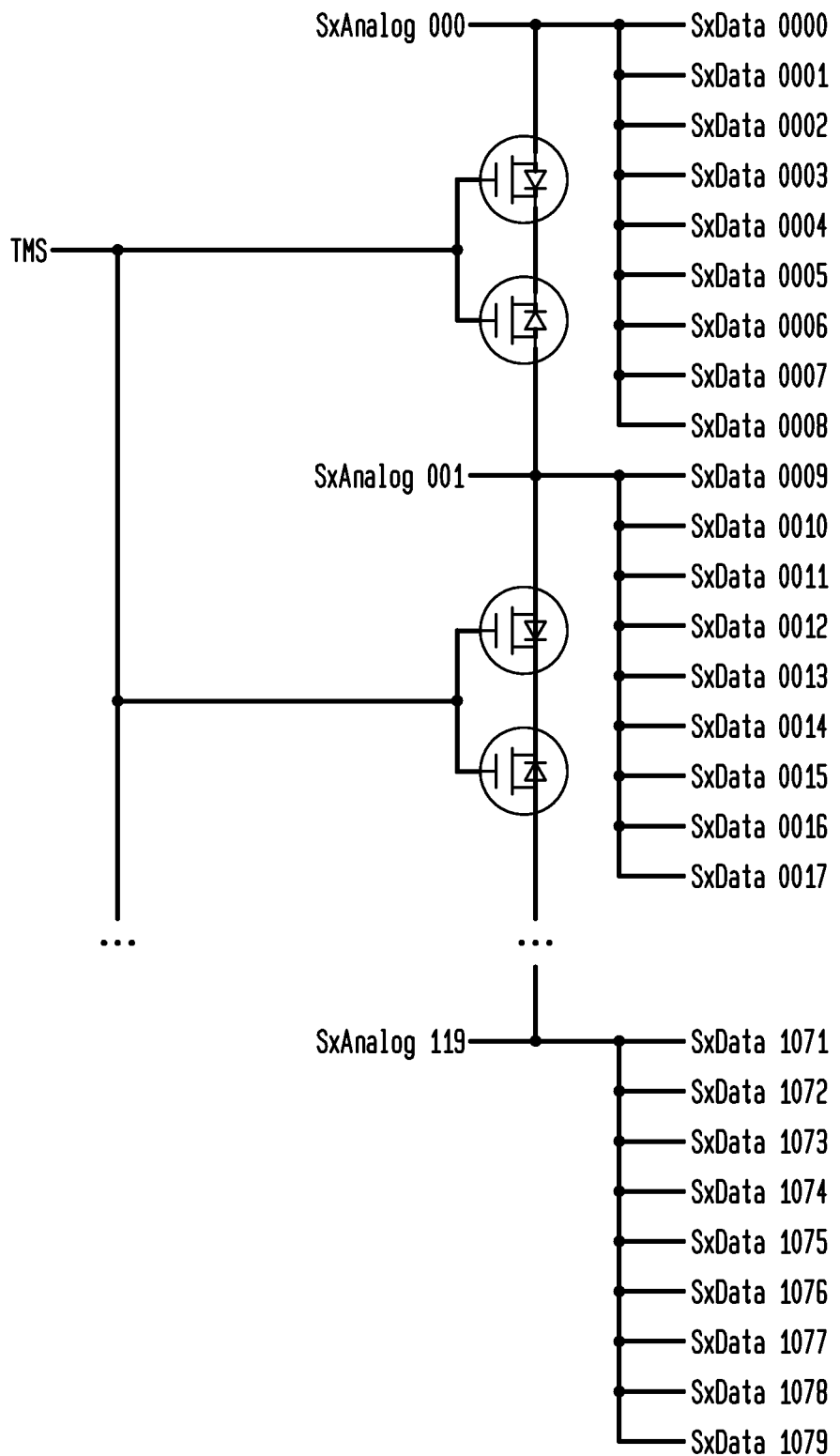
FIG. 15 is a schematic diagram of analog data lines to the transmit-receive modules.

An example analog interface is illustrated schematically in FIG. 15. The SxAnalog lines are 120 traces connecting nine adjacent SxData rows each. In other words, internally SxData0000 through SxData0008 row traces are all connected to output pin SxAnalog000. SxData0009 through SxData0017 row traces all connect to output pin SxAnalog001, etc. Every SxAnalog pin is hardwired to nine internal SxData traces. Only one trixel memory bank 90 at a time will be allowed to drive or sense its local trace (enforced by the external controller). If TMS is asserted, all SxAnalog and SxData lines are connected together.

It may be noted that, as discussed above, since the control lines are individually controllable, an input or output scheme of any size from 1 to 120 wide can be implemented simply by connecting these lines together external to the Sensay (sensor-display device) and enabling only the appropriate trixels 82 to match the architecture. The wider the interface the faster the load and unload operations, but the more external circuitry is required. This allows a high degree of customization without changing the design.

Figure 16:
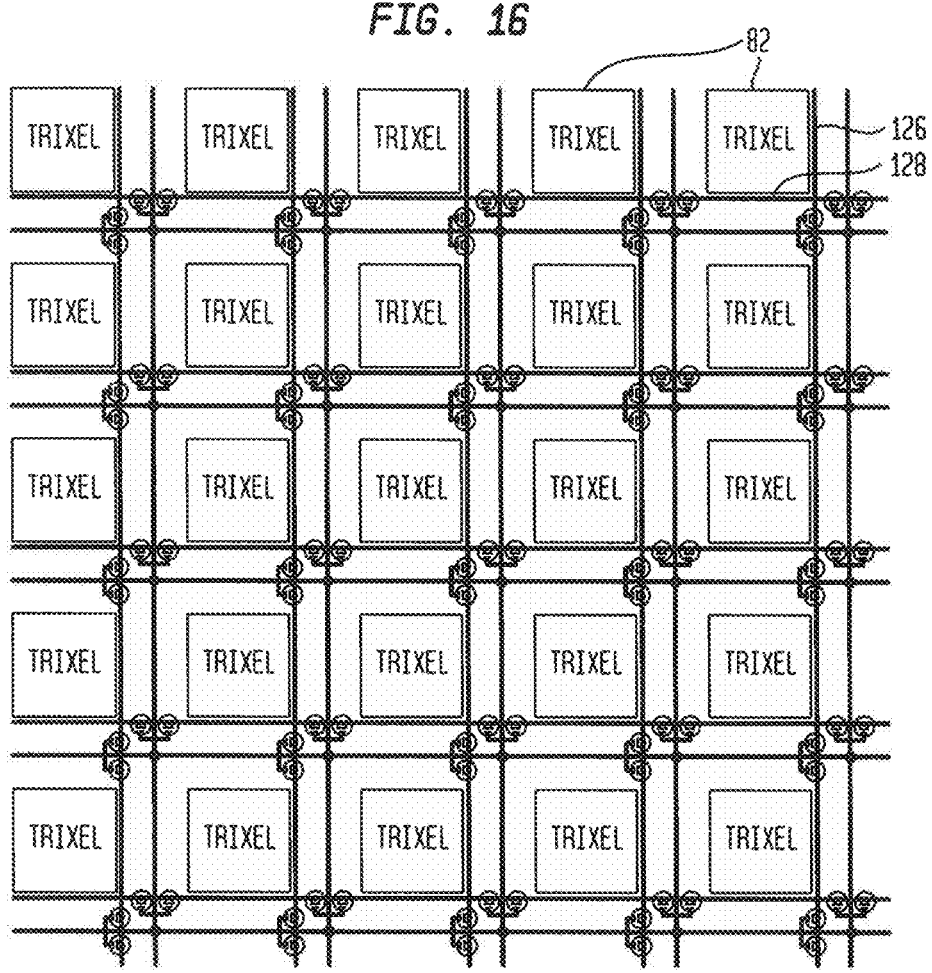
FIG. 16 is a diagrammatic representation of some of the transmit-receive modules (trixels) in the array interconnected in a pooling chain.
Figure 17:
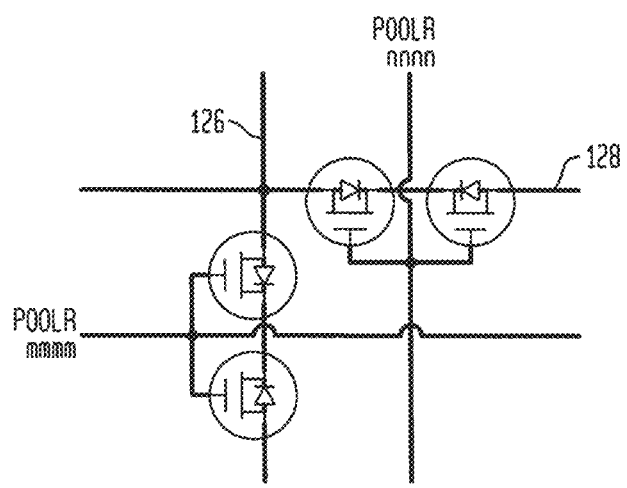
FIG. 17 is an enlarged schematic diagram of the interconnections of the pooling border lines of transmit-receive modules (pixels) with adjacent transmit-receive modules (trixels).

The Sensay (sensor-display device) 14, 26 architecture in the example photonic neural network system 10 is built around pooling chains. As shown in FIGS. 9, 10, and 16, each of the transmit-receive modules (trixels) 82 in the array 80 has pooling border lines 96 along two of its edges, e.g., along the right and bottom edges as those FIGS. 9, 10, and 16 are oriented on the papers. All sensor, modulator, memory read or memory write accesses use the pooling chain to pass the analog data within and between trixels (sensor-display devices) 82. The function of the pooling border lines 96 is to connect or disconnect neighboring transmit-receive modules (trixels) 82 from the pooling chain, creating a super trixel or "island." The pooling chain circuit connections to the borderlines 96 of respective adjacent trixels 82 are shown in the enlarged schematic diagram of the connections in FIG. 17 at a hypothetical location nnnn,mmmm in the array 80 of trixels 82. If POOLC=0, then all east-west trixel pooling chain connections for the entire column are opened. If POOLR=0, then all north-south trixel pooling chain connections for the entire row are opened. All other trixel pooling chain connections are still closed. The effect of this pooling structure is to create islands of connected pooling chain lines. All trixels on a super trixel island share this chain, which is essentially a single low-impedance "trace". If POOLR is asserted, the transistors connecting this trixel's pooling chain will conduct, connecting the pooling chain with the trixel 82 south of it on the next row. If POOLC is asserted, it will connect to the pooling chain for the trixel 82 to the east.

Figure 18:
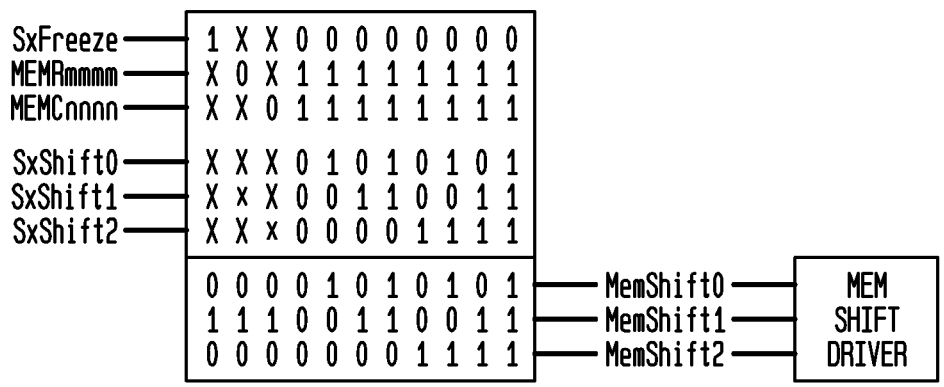
FIG. 18 is an example memory shift driver for the memory bank in the example transmit receive modules of the example photonic neural network system 10.

As mentioned above, the memory bank 90 in each of the transmit-receive modules (trixels) 82 are essentially shift registers, and shift register designs and technology are well-understood by persons skilled in the art and readily available. FIG. 18 shows an analog memory shift driver scheme. If addressed (MEMC and MEMR are both asserted) and unfrozen (SxFreeze is deasserted), any combination of SxShift0,1,2 will simply propagate to the outputs (MemShift0,1,2) that actually drive the analog memory cell shift plates. If either MEMC or MEMR are deasserted for a Trixel or if SxFreeze is asserted, the analog memory driver automatically is placed in a safe state (MemShift0,1,2=010).

Figure 19:
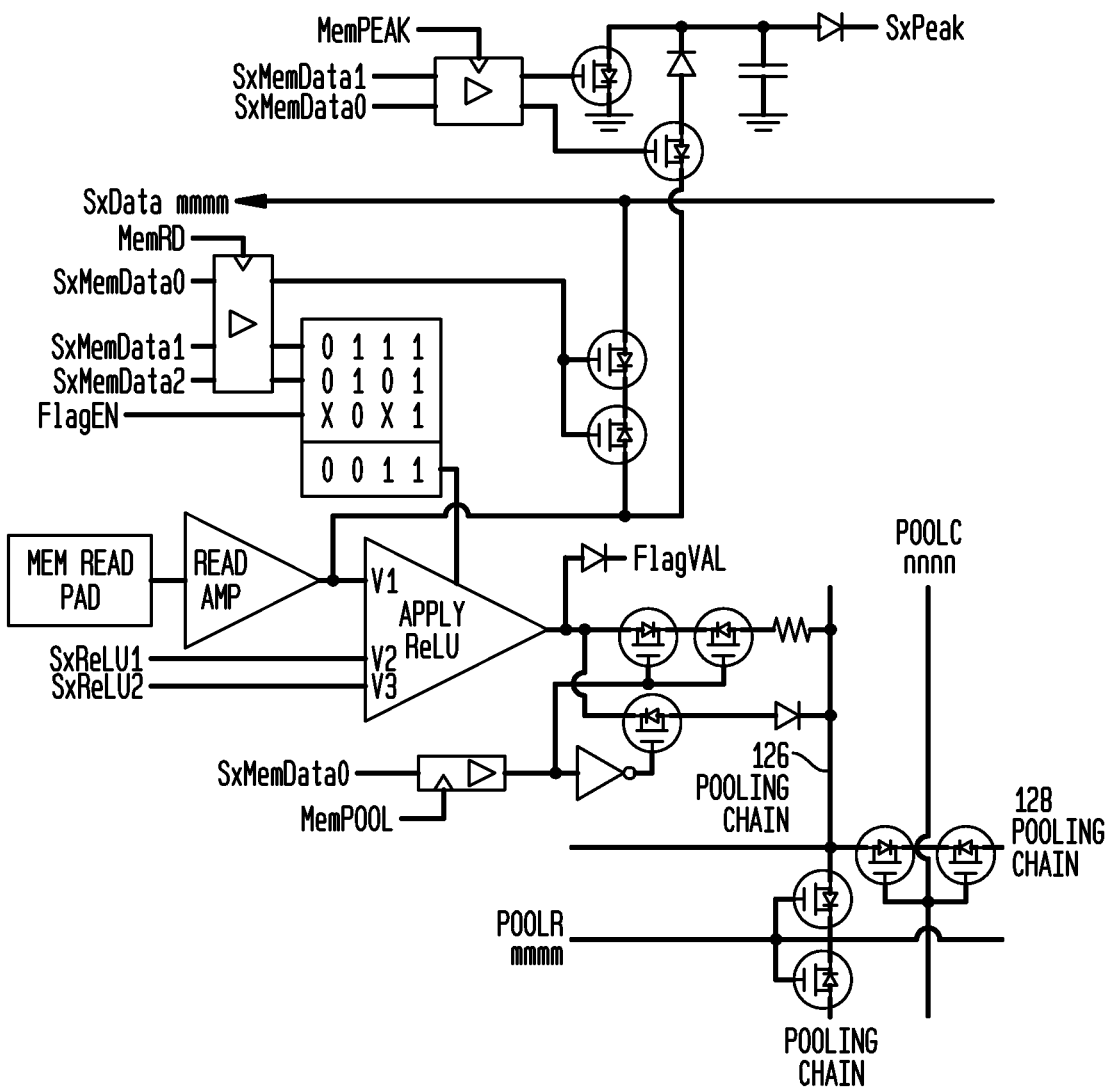
FIG. 19 is a schematic diagram of an example analog memory read interface for the memory bank.
Figure 20:
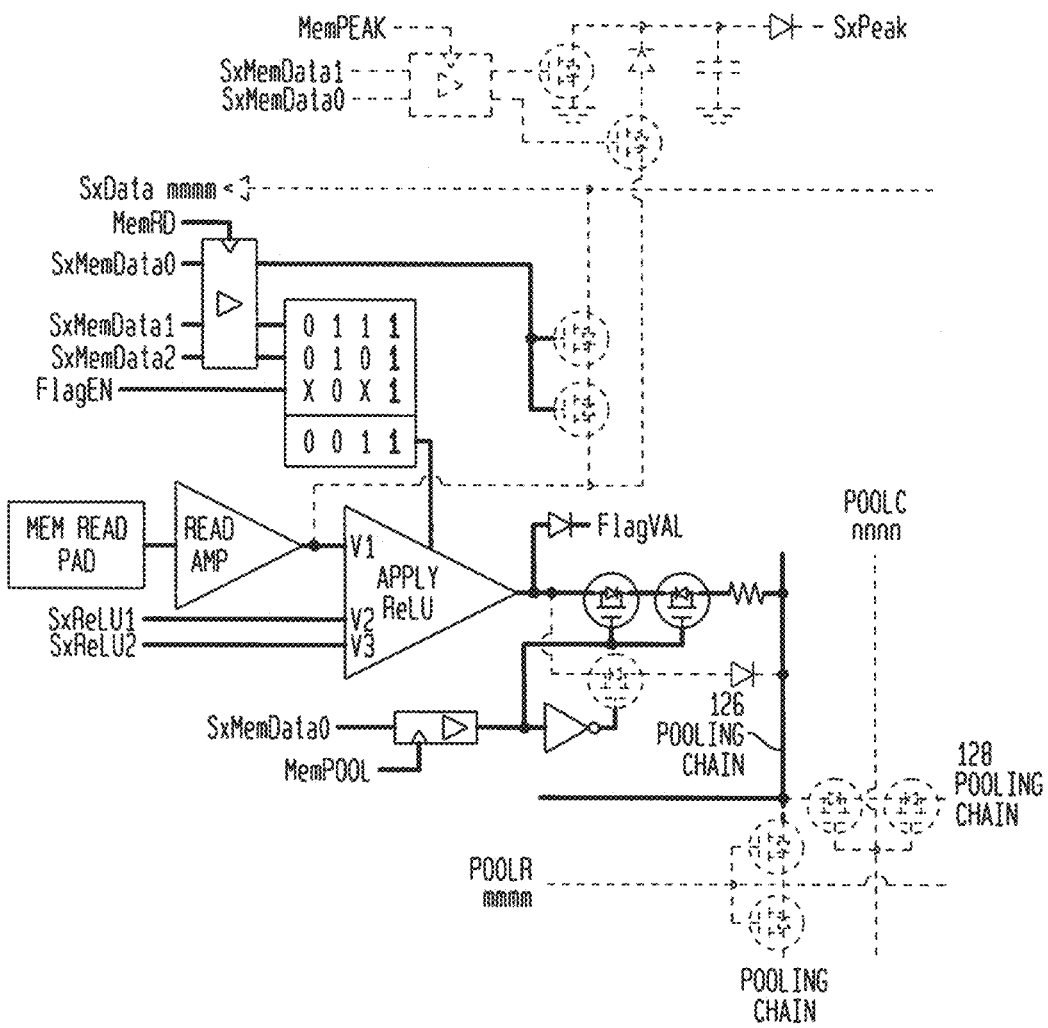
FIG. 20 is a schematic diagram that illustrates transmit-receive module (trixel) analog memory read mean to pooling chain.
Figure 21:
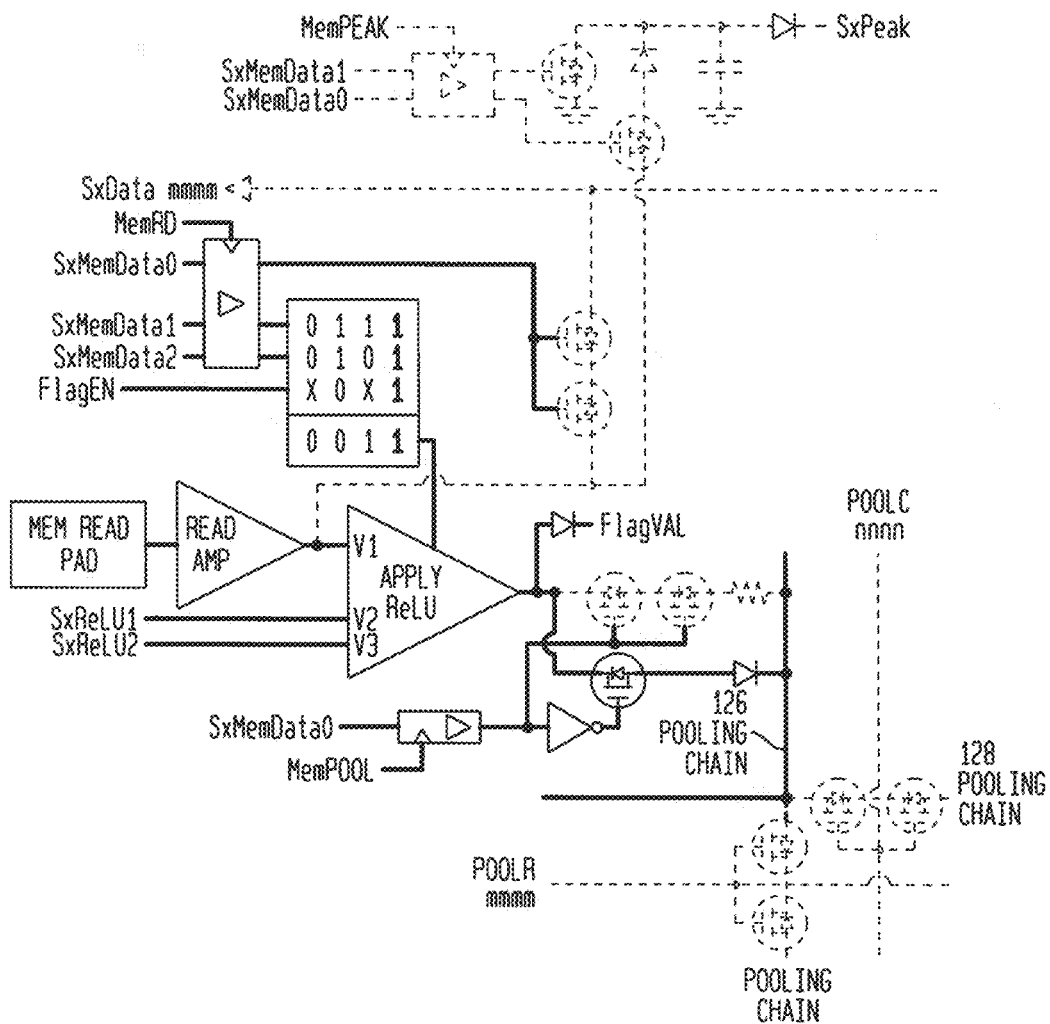
FIG. 21 is a schematic diagram that illustrates transmit-receive module (trixel) analog memory read Max to pooling chain.
Figure 22:
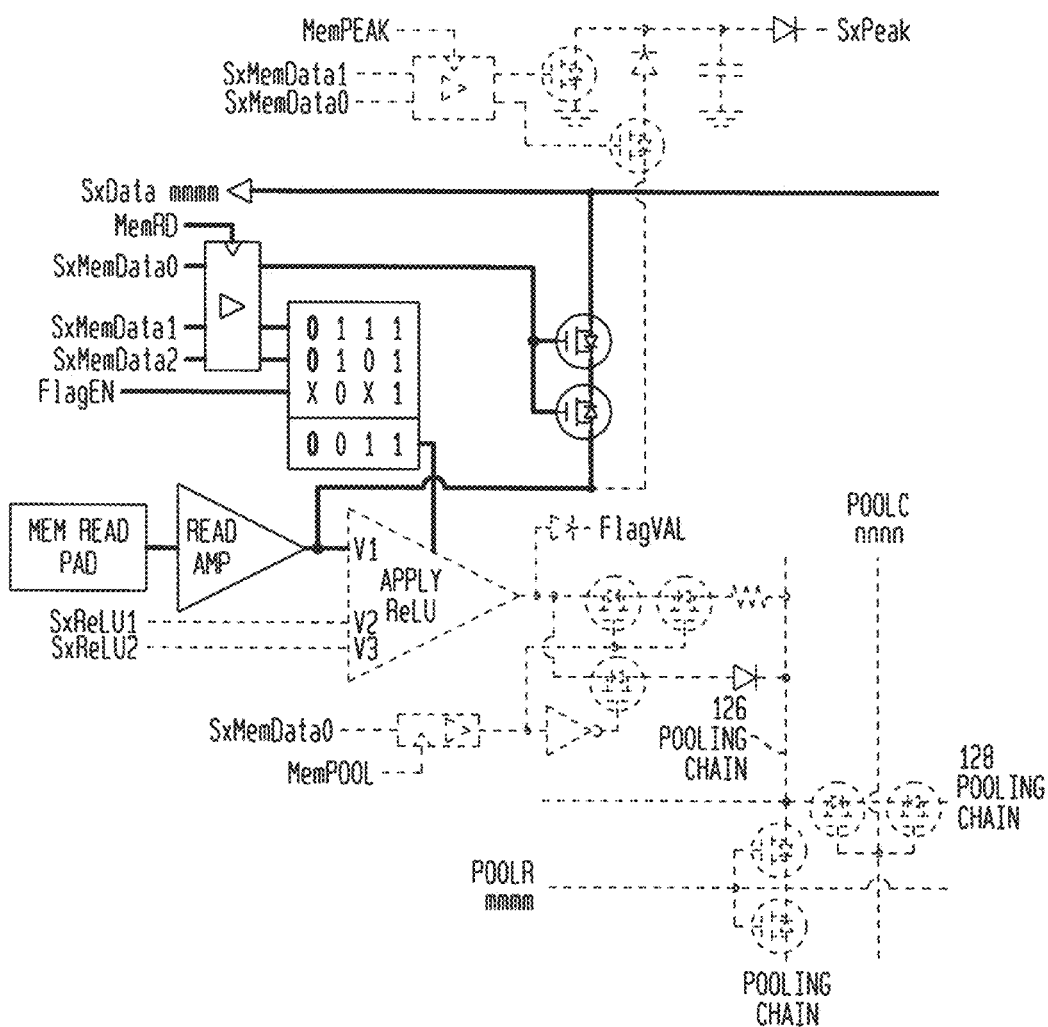
FIG. 22 is a schematic diagram that illustrates transmit-receive module (trixel) analog memory read to external data line.
Figure 23:
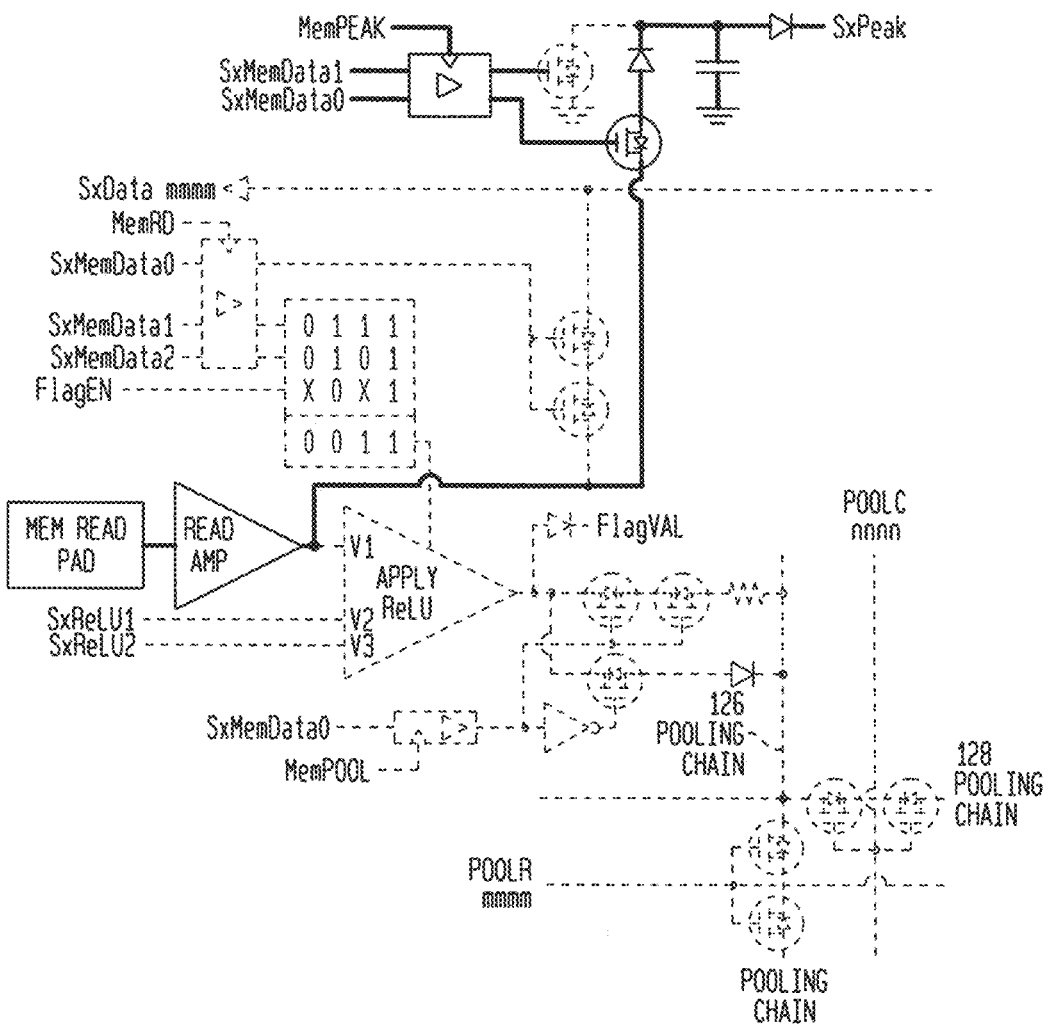
FIG. 23 is a schematic diagram that illustrates transmit-receive module (trixel) analog memory peak value save.
Figure 24:
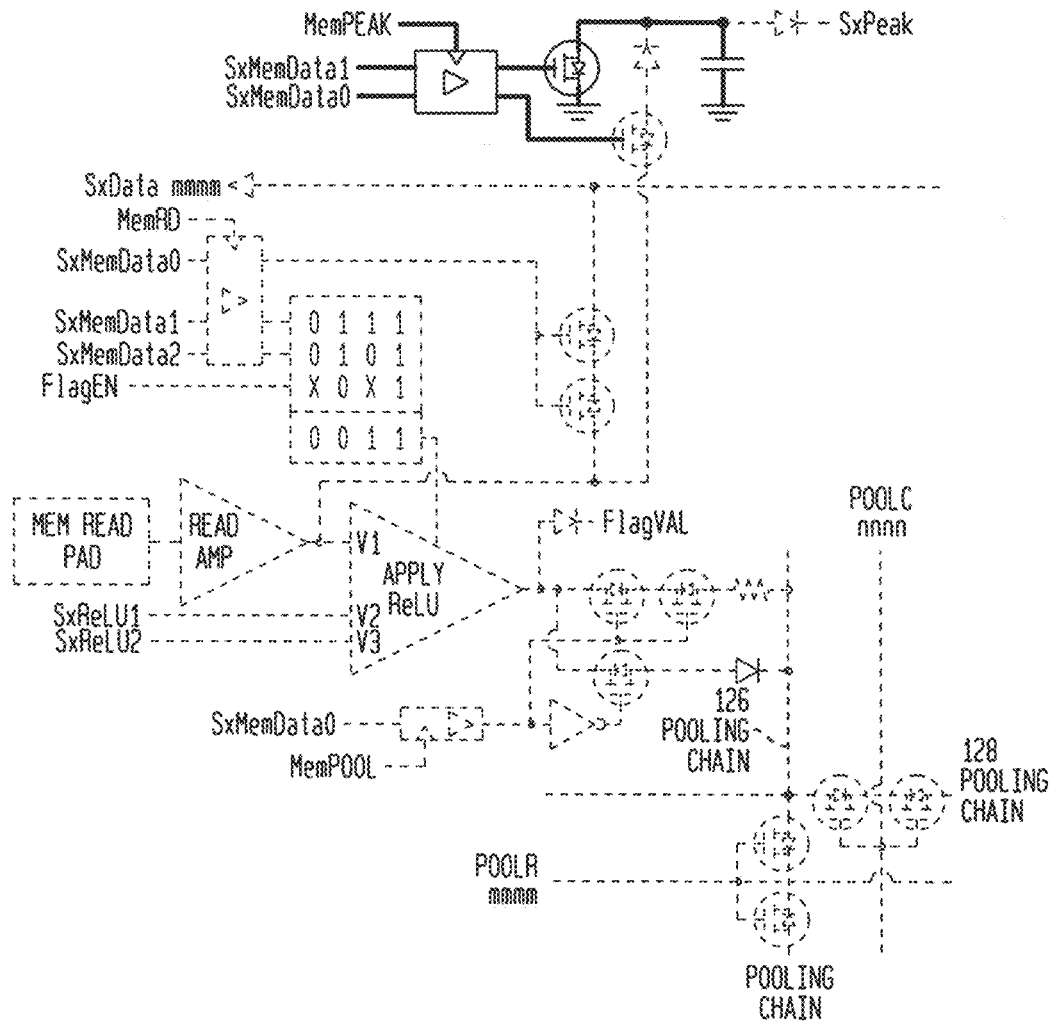
FIG. 24 illustrates transmit-receive module (trixel) analog memory peak value reset.

FIG. 19 is a schematic diagram of an example analog memory read interface for the memory bank 90 (FIG. 10). Memory can be read and the analog data routed via the internal SxData lines to the external SxAnalog interface or it can be sent to the pooling chain 126 (if greater than SxReLU, otherwise it is zeroed) through either a maximum (the diode) or a mean (the resistor) circuit path. The unmodified value read from analog memory is also used to charge a diode-isolated capacitor (a sample-and-hold circuit), ultimately driving the SxPeak value for the entire sensor-display device (sensay) 14, 26 (used externally for system gain control). Examples of these modes are shown schematically in FIGS. 20-24. FIG. 20 illustrates trixel analog memory read mean to pooling chain. FIG. 21 illustrates trixel analog memory read Max to pooling chain. FIG. 22 illustrates analog memory read to external data line. FIG. 23 illustrates trixel analog memory peak value save. FIG. 24 illustrates analog memory peak value reset.

Figure 25A:
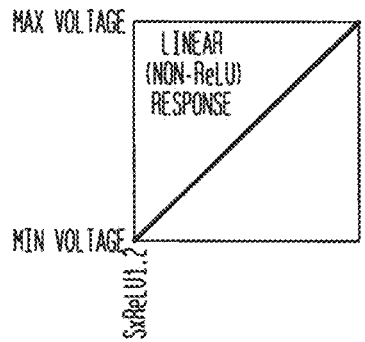
FIG. 25 shows graphical representations of example rectified linear unit (ReLU) responses.
Figure 25B:
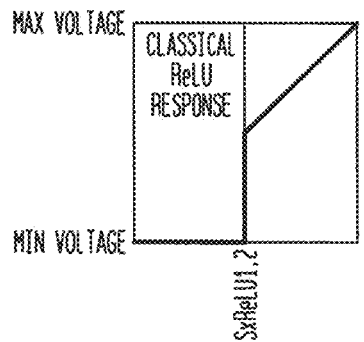
Figure 25C:
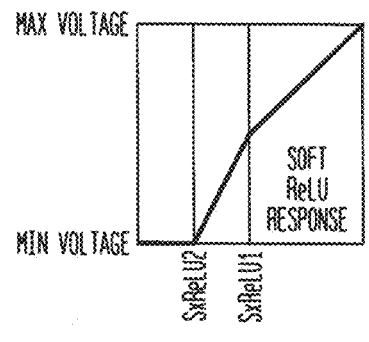

Rectified Linear Units (ReLU) are often applied to data to suppress weak responses. The first sensor-display device 14 and the second sensor-display device 26 (sensays 14, 26) each has a flexible dual-slope ReLU implementation which can result in a variety of responses shown in FIG. 25, ranging from no effect (Example A) to a traditional cutoff (Example B) to a variable-slope cutoff (Example C). Two external analog voltages, driven by DACs, control the transfer function. Since the sensays 14, 26 are of a unipolar design, the "zero" location is nominally at the center of the memory bank 90 voltage range.

Figure 26:
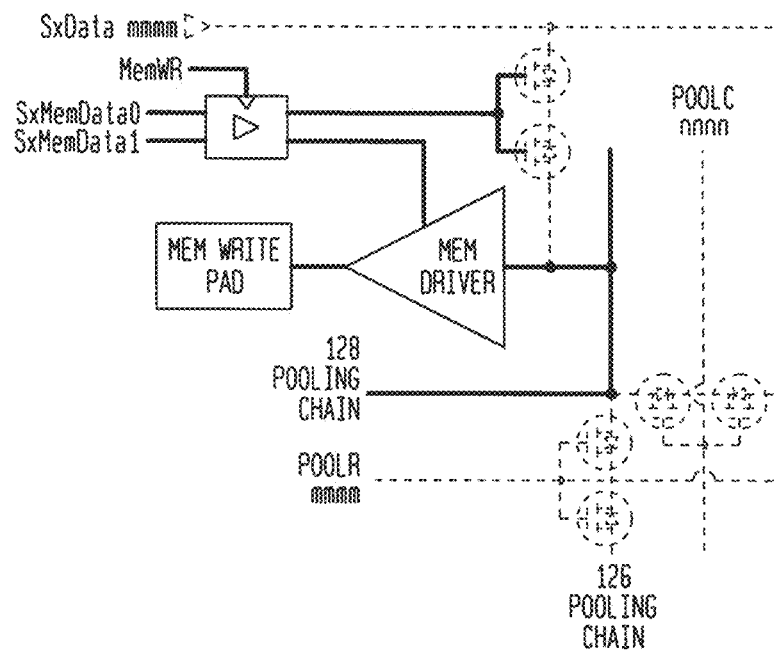
FIG. 26 is a schematic diagram illustrating writing into the analog memory of the transmit-receive module (trixel)
Figure 27:
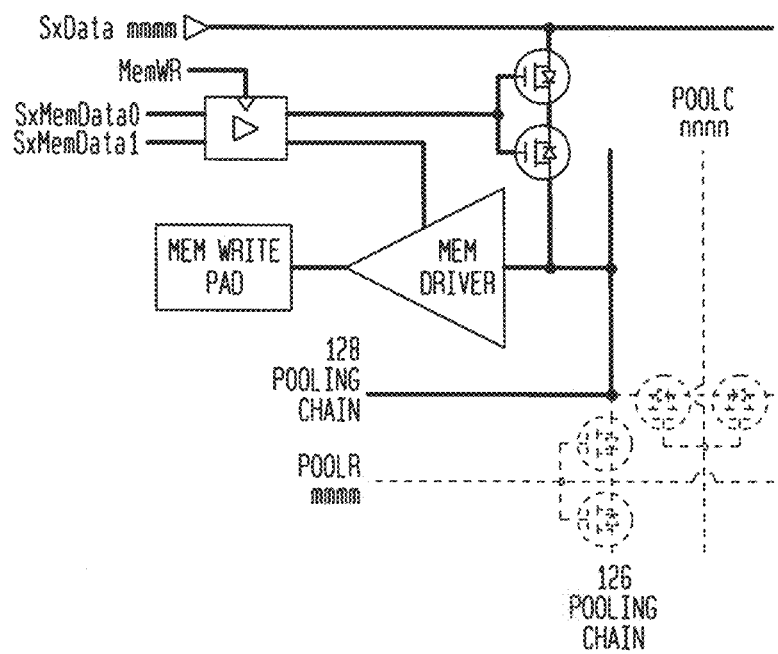
FIG. 27 is a schematic diagram illustrating loading analog memory from an external data line.

Writing to the analog memory 90 is simples: than read. When the analog memory 90 of the transmit-receive module (trixel) 82 is addressed (MEW and MEMR both asserted and SxRWDir=1), whatever value is on the local pooling chain is placed on the write pad as shown in FIG. 26. To actually save the value in the analog memory cell, the shift lines are cycled. Loading analog memory 90 from an external data line is illustrated in FIG. 27.

Flag memory is a 640-bit Last-In-First-Out (LIFO) device (i.e., a "Stack") at each transmit-receive module (trixel) 82 used for semantic labeling implementations. If SxFlagRST=1 the internal address pointer is unconditionally set to zero for all transmit-receive modules (trixels) 82. It is not necessary to zero the values. Except for reset, the memory is only active when FLAGRmmmm=1 and FLAGCnnnn=1 for hypothetical Trixel location nnnn, mmmm. If either FLAGRmmmm=0 or FLAGCnnnn=0 no signals will affect the memory. For FLAGR and FLAGC see FIG. 14.

Figure 28:
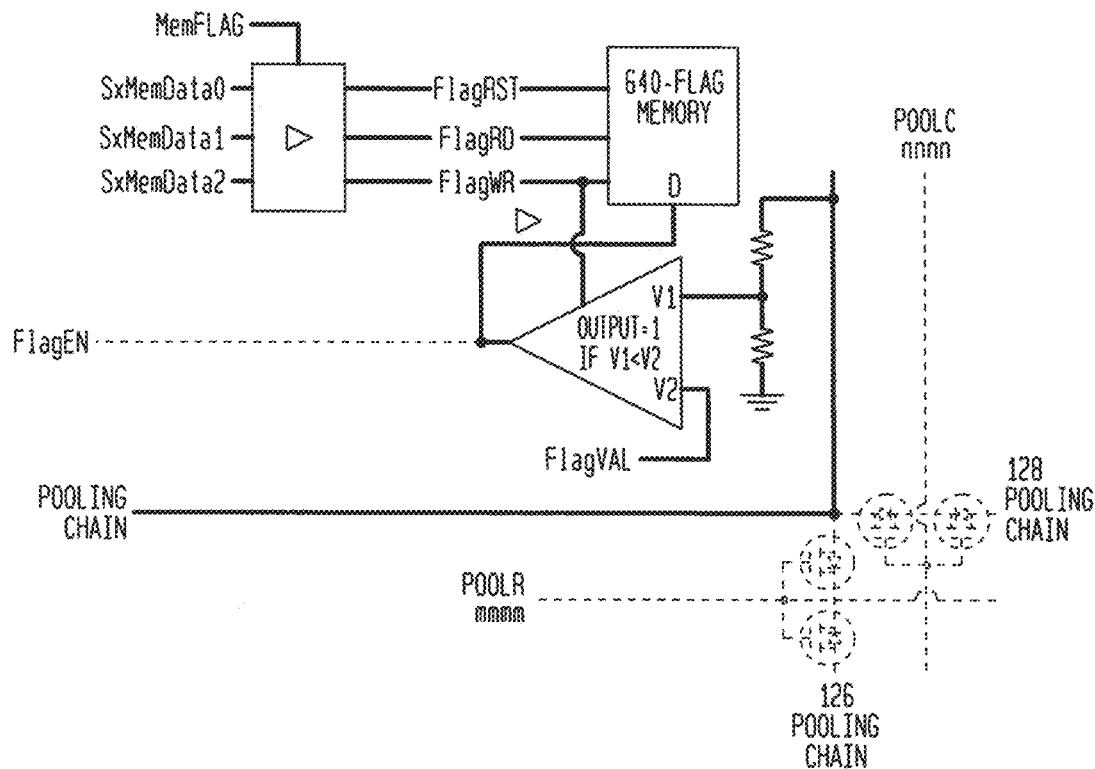
FIG. 28 is a schematic diagram illustrating a flag memory write circuit.
Figure 29:
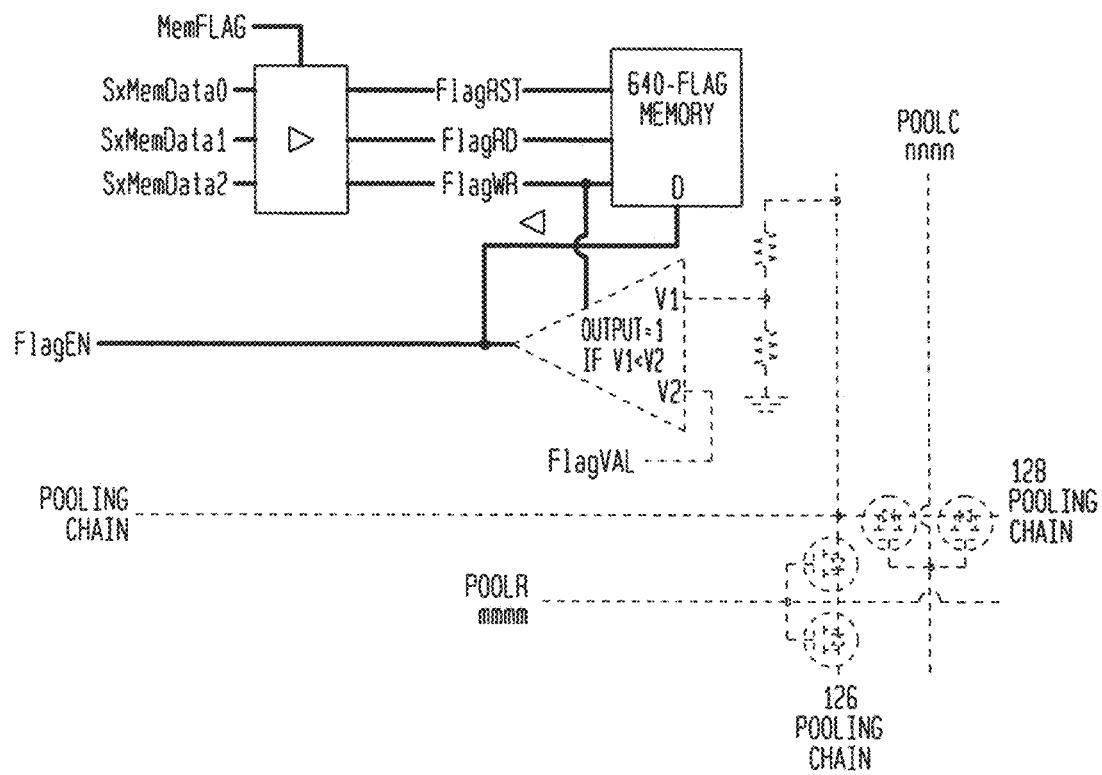
FIG. 29 is a schematic diagram illustrating a flag memory read circuit.

Schematic diagrams for flag memory write and for flag memory read are shown in FIGS. 28 and 29, respectively. When SxFlagWR=1 the comparator output is valid at the "D" memory input. On the falling edge as SxFlagWR goes from "1" to "0", while SxFlagRD=0, the current flag bit, determined by the state of the trixel's current read value compared to the value on the pooling chain, is pushed onto the stack. In other words, if the analog memory read voltage matches the pooling chain voltage, then this trixel 82 is the "master" and a "1" is stored; otherwise a "0" is stored. For FlagVAL see FIG. 19.

Since there is a very small hysteresis, it is possible for more than one trixel 82 to see itself as the "master" if they have very similar voltage levels. In such a case, the eventual read will be the mean voltage of the enabled trixels 82 in this pooling group during the expansion pass. Since the "competing" voltages were nearly identical, this will have little practical effect.

On the rising edge of SxFlagRD=1, while SxFlagWR=0, the last bit written (i.e., on top of the stack) is read and applied as an enable FlagEN=1 to the Trixel Memory Read circuit (see FIG. 19). The output is enabled so long as SxFlagRD=1.

If SxFlagWR=0 and SxFlagRD=0 then FlagEN=1. This applied. SxFlagWR=1 and SxFlagRD=1 is illegal and the external controller should not apply it. To avoid a contention between the memory output and the comparator output, FlagEN is tri-stated in such a case.

Figure 30:
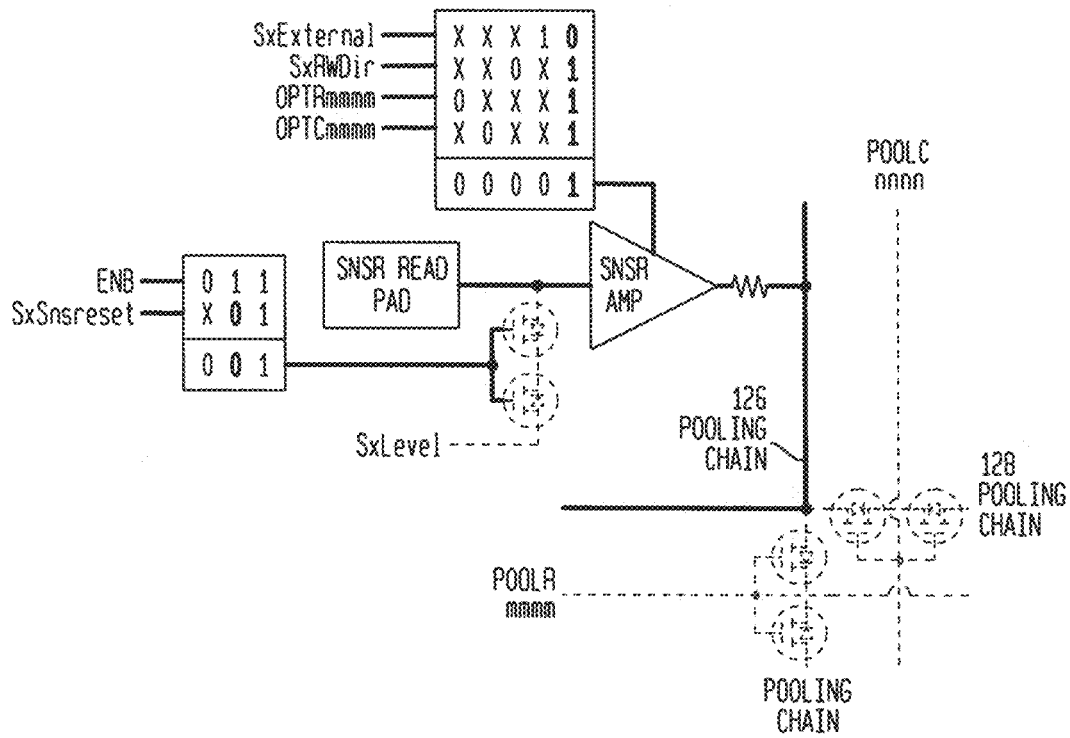
FIG. 30 is a schematic diagram illustrating optical control line settings for reading a transmit-receive module (trixel) sensor to the pooling chain.
Figure 31:
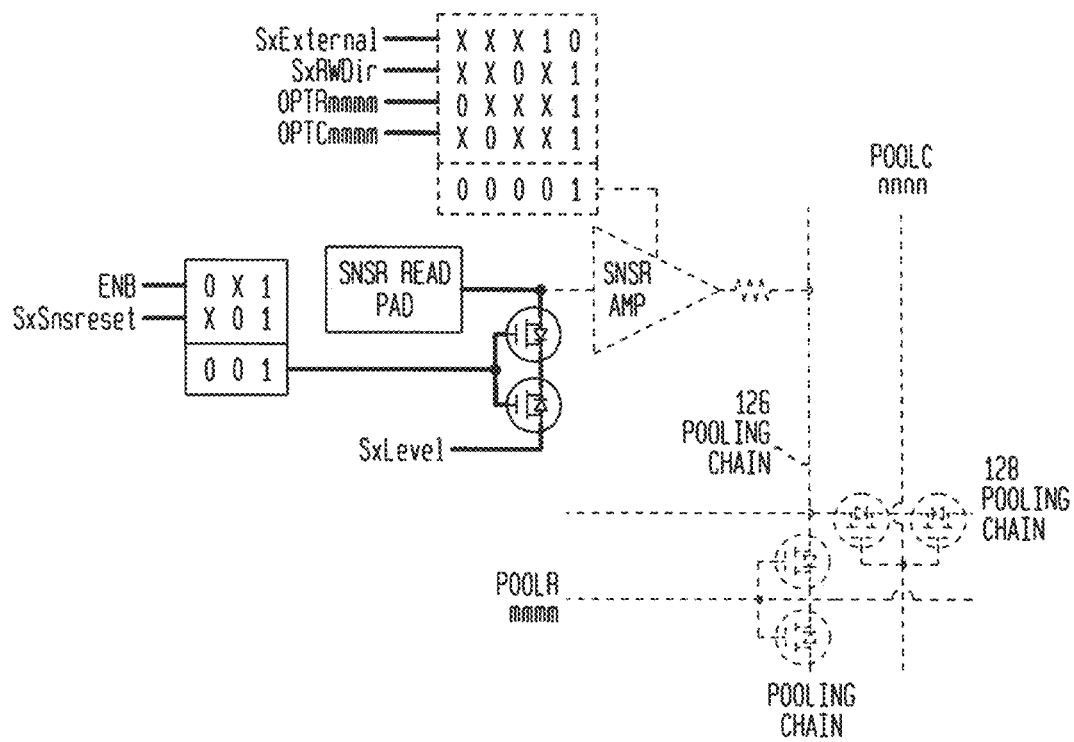
FIG. 31 is a schematic diagram illustrating optical control lines for re-setting the transmit-receive module (trixel) sensor.
Figure 32:
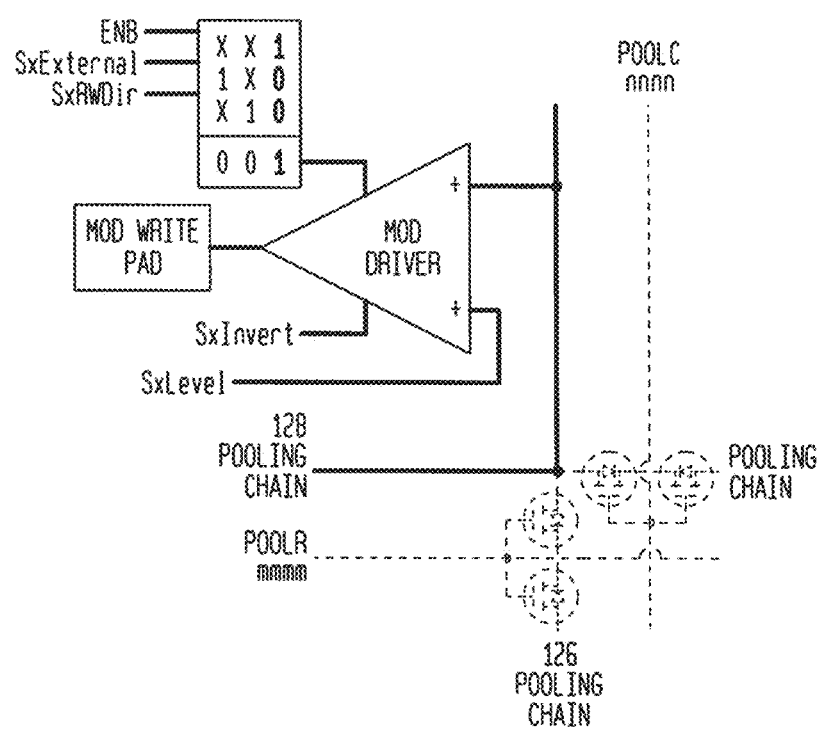
FIG. 32 is a schematic diagram illustrating optical control line settings for writing the light transmitter element (modulator) from the pooling chain.

Examples of optical control line settings for reading the sensor 86 of the transmit-receive module (trixel) 82 to the pooling chain, re-setting the sensor 86, and writing the modulator (light transmitter element) 84 from the pooling chain are illustrated in FIGS. 30, 31, and 32, respectively. The function of the Optical Control lines is to cause trixels 82 at the intersection of enabled OPTR and OPTC lines to connect their optical elements (Modulators 84 or Sensors 86) to the pooling chain. If SxRWDir=0 and SxExternal=0, then data will be read the pooling chain to drive this trixel modulator 84. If SxRWDir=1 and SxExternal=0, then data will be buffered from this trixel's sensor 86 and placed on the pooling chain. If SxExternal=1, then both Modulator 84 and sensor 86 are disconnected. Multiple sensors 86 can be enabled simultaneously; the mean of their values will appear on the pooling chain for lower noise. Also note that, when the sensors 86 are summing the optical signal (frame of data)

as explained above, there is no other activity on sensay 14, 26 (no clocks, etc.), which will result in very low-noise measurements.

If in modulator mode (SxRWDir=0) and internally driven (SxExternal=0), all addressed trixel memory bank 90 outputs are automatically pooled and all light transmitter elements (modulators) 84 in the same super trixel (connected to the same pooling chain) "shine" at the same brightness. This constitutes resampling by replication.

The local ENB (ENBRmmmm=1 and ENBCnnnn=1) allows the individual light transmitter element (modulator) 84 to be disabled.

The drive level, DL, for the light transmitter element (modulator) 84 is the sum of the pooling chain, PC, multiplied by the calibration sensor value, CS+1, plus SxLevel; as an equation DL=(PC*(CS+1))+SxLevel. If SxInvert=1 then the drive is inverted; i.e., a 100% level will be 0% modulation, 90% will be 10%, etc.

The schematic diagram in FIGS. 33A-B show an overview of the transmit-receive module (trixel) circuitry.

The explanations above are based on photonic neural network processing in an inference mode, e.g., where a trained neural network is used to recognize images, speech, sound, etc. Training a neural network with a photonic neural network, for example, a photonic neural network system 10 described above, has some differences as compared to a digital convolutional network system. As mentioned above, during training of a typical digital convolutional neural network system, adjustments are provided with a process called backpropagation to increase the likelihood of the network to predict the same kind of image the next time around. In typical digital convolution neural networks, such data processing and backpropagation is done over and over until the predictions are reasonably accurate and are not improving. The neural network can then be utilized in inference mode to classify new input data and predict a result that is inferred from its training. In a digital convolutional neural network, training is relatively straightforward since back-propagation terms and filters are all in the spatial domain. Taking the "right answer" and moving back through the structure to calculate a corrective term is slow, but still doesn't require a change in domain. Training in a photonic neural network is not as direct, since the terms that need to be trained are in the frequency domain while the convolution results are in the spatial domain. One could use the spatial domain data, calculate the corrective terms with fast Fourier transform (FFT) algorithms, and apply them to the Fourier filters used in the radial modulator device 20, but such calculations are very computationally intensive.

Figure 34:
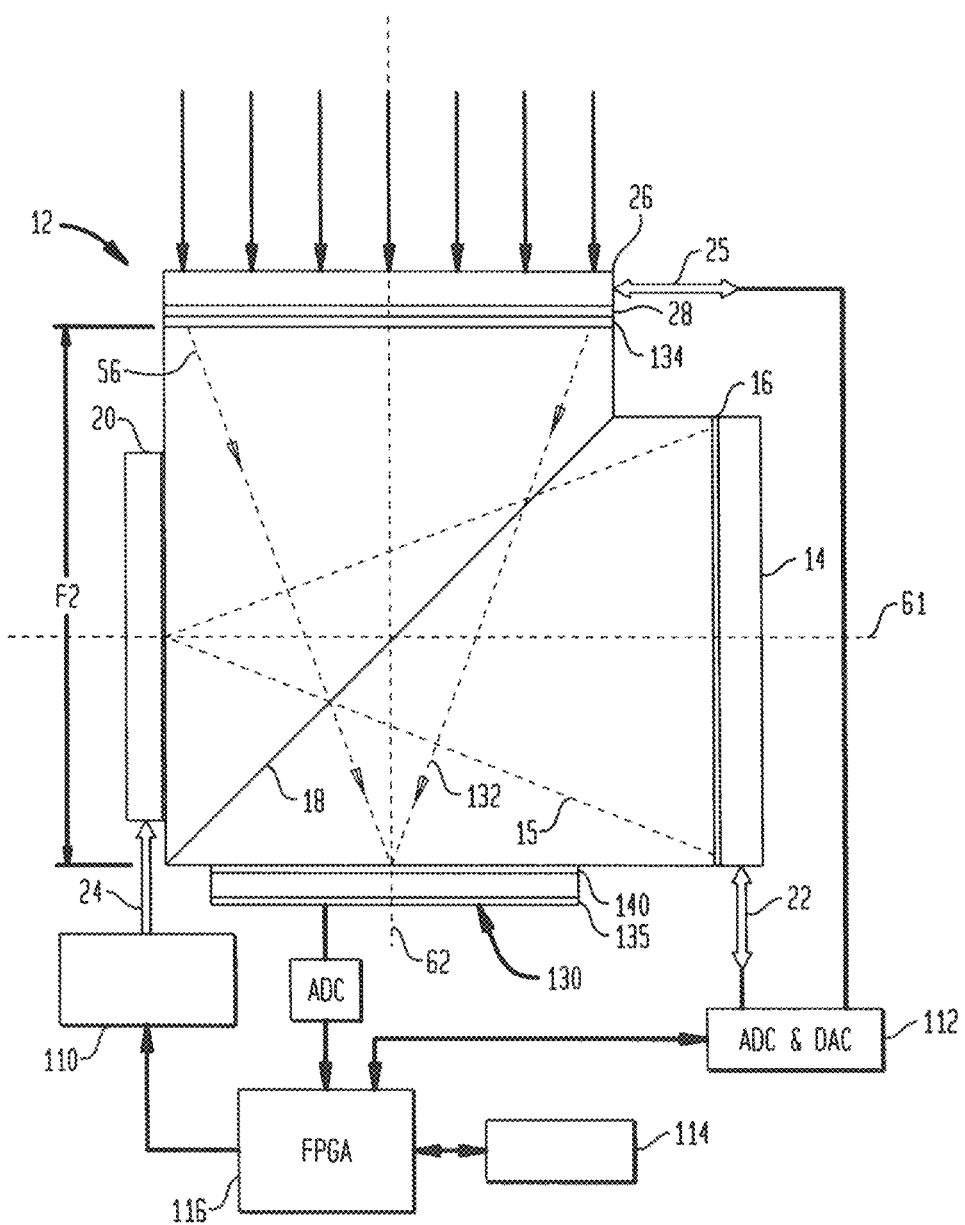
FIG. 34 shows the example photonic convolution assembly with a Fourier light sensor device for Fourier transforming frames of corrective data in training mode.

Instead, the example photonic neural network system 10 described above is adapted to convert corrective terms for training into Fourier transform terms that can then be added to filters that are applied by the radial modulator device 20 to the convolutions in the iterative training process. An example adaptation to implement such conversions optically instead of digital computations includes adding a specialized Fourier light sensor device 130 to the photonic convolution assembly 12 as shown in FIG. 34. The Fourier light sensor device 130 is positioned on the opposite side of the polarizer 18 from the second sensor-display device 26 on the optic axis 62 in axial alignment with the second sensor-display device 26. The Fourier light sensor device 130 is also positioned in the Fourier transform plane at a distance from the second Fourier transform lens 28 equal to the focal length F2 of the second Fourier transform lens 28. Therefore, the second Fourier light sensor device 130 is positioned at the Fourier transform plane of the second Fourier transform lens 28. In that Fourier transform plane, the second Fourier light sensor device 130 can detect the Fourier transforms of frames of data or images in light that emanates from the second sensor-display device 26, Therefore, the corrective terms needed for training a photonic neural network system 10 (FIG. 1) can be fed in spatial domain frames of corrective data to the second sensor-display device 26, which will then display (project) the frames of corrective data in a light field 132 to the Fourier light sensor device 130. Accordingly, the frames of corrective data in the light field 132 are Fourier transformed by the Fourier transform lens 28 when they reach the Fourier light sensor device 130, i.e., the frames of corrective data in the spatial domain are Fourier transformed at the speed of light to the Fourier domain at the Fourier light sensor device 130. Those frames of corrective data in the Fourier transform domain are then detected by the Fourier light sensor device 130 and used to adjust the filters for the radial modulator device 20.

Ordinarily, in the inference mode, the frames of data that exist at particular iterative convolution cycles it the memory banks 90 (FIG. 10) of the transmit-receive modules (trixels) 82 are lost as the 3D convolution blocks are shifted out of memory and sent back through the photonic convolution assembly 12 for further levels of convolution and summing cycles and the memory banks 90 are re-filled with the subsequent 3D convolution blocks, all of which occurs at very fast speeds as explained above. For training mode, however, those intermediate frames of data are extracted from the memory banks 90 of the transmit-receive modules 82 in the first and second sensor-display devices 14, 26 and transferred into external memory for use in doing backpropagation digital calculations and writing corrective terms in the spatial domain. Then, those corrective terms are fed as frames of corrective data in the spatial domain into the second sensor-display device 26 for projection and Fourier transformation to the Fourier light sensor device 130, as shown in FIG. 34 and explained above, so the Fourier transformed frames of corrective data can be detected by the Fourier light sensor device 130 in the Fourier domain for use as filters in the radial modulator device 20 for further convolution cycles. This training mode extraction of intermediate correlation data, back-propagation digital calculations, and writing corrective terms takes some time, thus slows the iterative convolution-summing cycles as compared to the inference mode of operation, hut it is still much faster than digital convolution neural network training.

To accommodate the Fourier light sensor device 130 in the photonic convolution assembly 12, as shown, for example, in FIG. 34, a half-wave variable polarization plate 134 is positioned between the second sensor-display device 26 and the polarizer 18 for rotating the plane of polarization 90 degrees when a frame of corrective data is being projected by the second sensor-display device 26 to the Fourier light sensor 130. For example, if in normal inference mode of operation, the second sensor-display device 26 displays in P-polarized light, which reflects from the polarizer 18 to the radial modulator device 20, then for displaying or projecting a frame of corrective data to the Fourier light sensor 130 for training, the half-wave variable polarization plate 134 is activated to rotate the plane of polarization of the projected light field by 90 degrees to be S-polarized so that the resulting light field 132 passes through the polarizer 18 to the Fourier light sensor 130.

The frame of corrective data has values that need to be provided by filters to particular wedge segments 32 of the radial modulator device 20 (see FIG. 3) for training the neural network. Therefore, those frames of corrective data that are provided to the second sensor-display device 26 for projection to the Fourier light sensor device 130 in FIG. 34 are provided in formats that correspond to the wedge segments 32 of the radial modulator device 20 (see FIG. 3) that need to be modulated in the corrected manner for training the neural network, so that those corrective data will ultimately be placed into the filters that drive the appropriate wedge segments 32 in a corrected manner. Therefore, the Fourier light sensor device 130 detects light 132 from the second sensor-detector device 26 in the same pattern as the wedge segments 32 in the radial modulator device 20, so that those corrective data in the light 132 get detected, processed, and fed to the appropriate wedge segments 32 of the radial modulator device 20.

Figure 35:
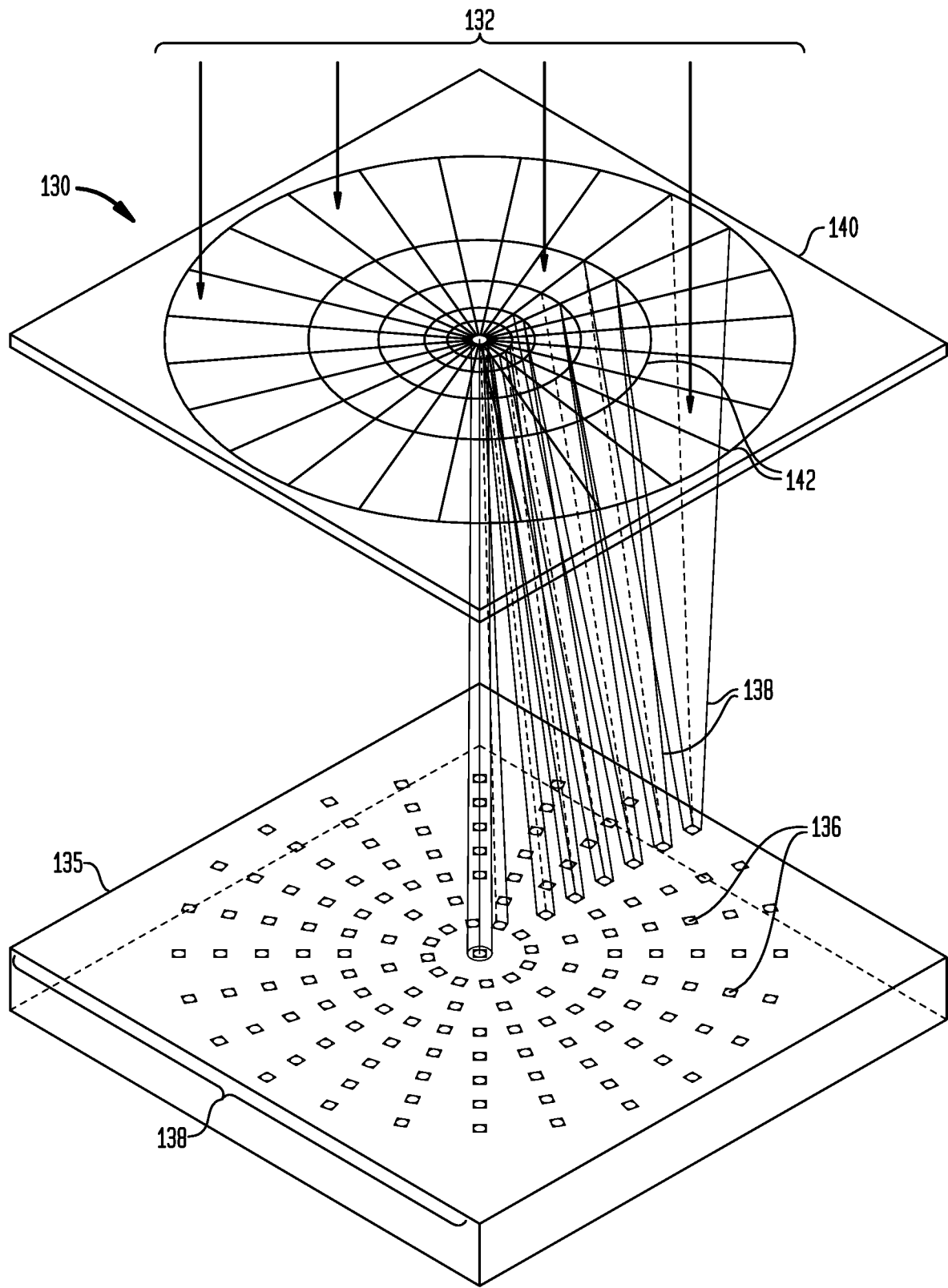
FIG. 35 is a diagrammatic, isometric view of an example Fourier light sensor device.

To facilitate detecting the light projected from the second sensor-display device 26 according to the same pattern as the wedge segments 32 (FIG. 3) of the radial modulator device 20, as explained above, the example Fourier light sensor device 130 has a light sensor board 135 as illustrated, for example, in FIG. 35 with a plurality of light sensor elements 136 arranged in a light sensor array 138 that corresponds to the pattern of wedge segments 32 and wedge sectors 34 of the radial modulator device 20 (FIG. 3). A radial array lens plate 140 is positioned in front of the light sensor array 138, as shown in FIG. 35, and has a plurality of individual lens elements 142 arranged in a radial pattern of wedges and sectors that match the wedge segments 32 and sectors 34 of the radial modulator device 20 in FIG. 3. Those lens elements 142 capture the incident light 132 from the second sensor-display device 26 in the radial pattern that corresponds to the radial pattern of wedge segments 32 and wedge sectors 34 of the radial modulator device 20, thus capturing the frame of corrective data in the incident light 132 as it was formulated and programmed into the second sensor-display device 26, The segments of light captured by the respective lens elements 142 are focused by the lens elements 142 as individual subbeams 138 onto the respective light sensor elements 136 and transduced into electric signals that correspond in intensity to the intensity of light that is incident on the sensor elements 136, thus transducing the frames of corrective data in the incident light 132 into electric data signals that correspond to the frames of corrective data. As illustrated in FIG. 34, those analog electric data signals can be converted to digital signals for processing by the FPGA 116 into corrective filters, which can then be fed by the circuit block 110 for connection to the radial modulator device 20 via the interface 24. Again, the frames of data in the incident light 132 are Fourier transformed by the Fourier transform lens 28 and sensed by the sensor elements 136 in the Fourier transform domain, so the corrective data in the signals sent from the Fourier light sensor device 130 to the FPGA 116 or other electrical processing components are in the Fourier domain as needed for driving the wedge segments 32 of the radial modulator device 20, Because of the arrangements of the optical components, the frames of corrective data fed into the second sensor-display device 26 may have to be inverted, so that the segments of light captured by the sensor elements 136 and corresponding signals produced match the proper wedge segments 32 of the radial modulator device 20. However, as explained above, the corrective terms are calculated in the spatial domain, so no algorithmic constraints are imposed on the training. Once the normal training back-propagation calculations are made, the optics described above and shown in FIGS. 34 and 35 convert the spatial domain corrective terms into radial Fourier domain equivalents.

Figure 36:
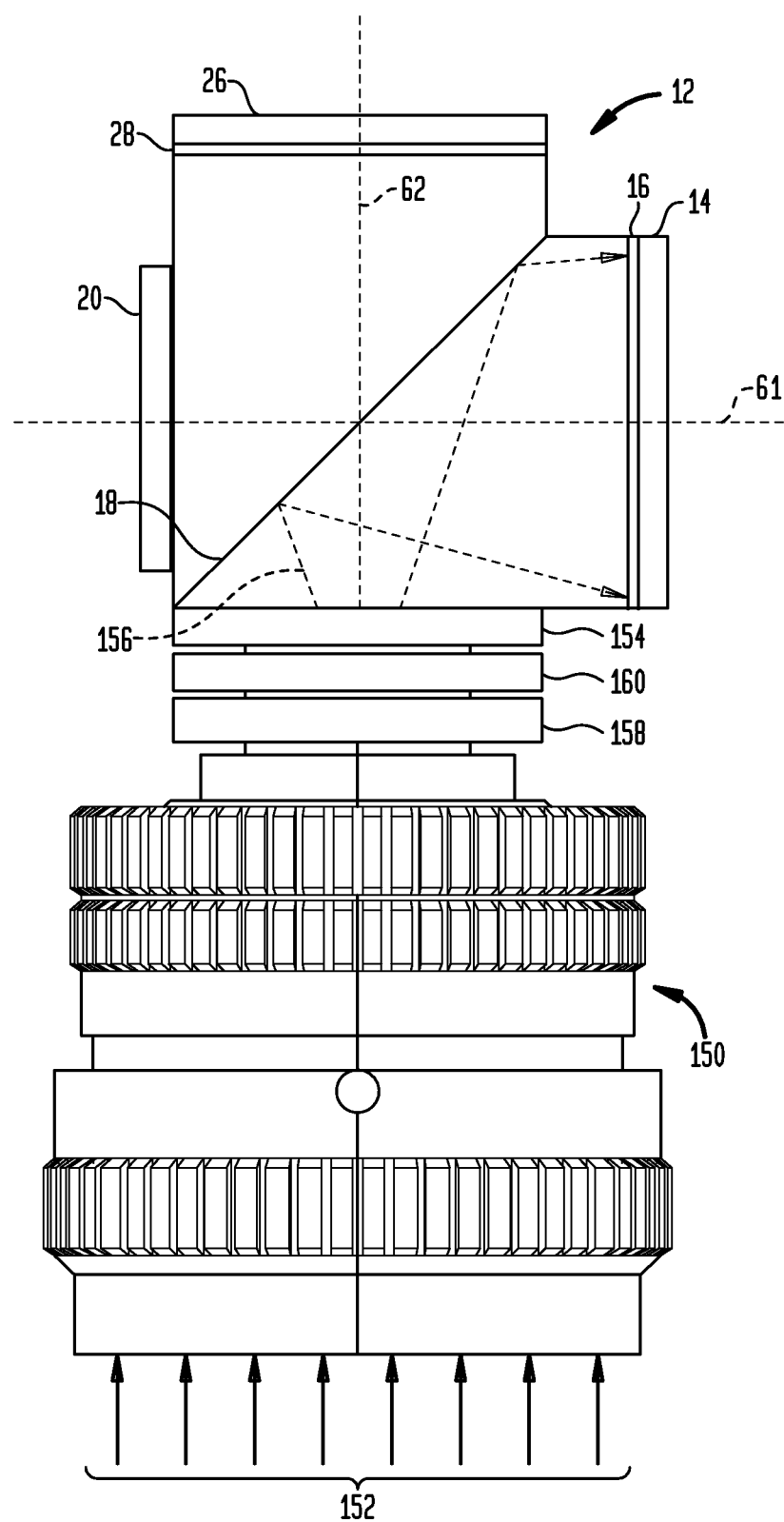
FIG. 36 shows the example photonic convolution assembly with a camera lens embodiment for introducing real world frames of data (images) into the photonic convolution assembly.

In another embodiment illustrated in FIG. 36, a camera lens 150 is mounted on the photonic convolution assembly 12 in a manner in which the camera lens 150 shines a real world scene 152 as a frame of data (image) in the spatial domain into the photonic convolution assembly 12 for processing in the example photonic neural network 10 (FIG. 1) as described above. For example, as illustrated in FIG. 35, the camera lens 150 is mounted on the optical axis 62 to align axially with the second sensor-display device 26 on the opposite side of the polarizer 18 from the second sensor-display device 26. A polarizing plate 154 is positioned between the camera lens 150 and the polarizer 18 for polarizing the light field 156 transmitted by the camera lens 150 to a polarization plane that reflects from the polarizer 18, so the light field 156 is reflected by the polarizer 18 to the first sensor-display device 14 as illustrated in FIG. 36. The light sensor elements 86 in the transmit-receive modules 82 of the first sensor-display device 14 (see FIGS. 9 and 10) detect and capture the frame of data (image) in the light field 156, and process the frame of data (image) into the memory banks 90 (FIG. 10) in the first sensor-display device 14, as explained above. A shutter device 158 on the camera lens 150 then closes over the camera lens 150 to terminate light transmission through the camera lens 150, and the first sensor-display device 14 can then begin processing the frame of data (image) through the photonic convolution assembly 12 in either an inference operation or a training operation as explained above.

A bandpass filter 160 can also be provided with the camera lens 150 for allowing only certain spectral frequencies of light to be transmitted into the photonic convolution assembly 12 if desired. The bandpass filter 160 can be a variable bandpass filter, if desired, so that various spectral frequency bands of the light from the real world scene 152 can be transmitted from the camera lens 150 into the photonic convolution assembly in a sequence, while the frame of data (image) in each frequency band is captured in sequence, thereby providing hyperspectral image sets for convolution sequentially through the photonic convolution assembly. Such variable bandpass filters are well-known. For example, a variable half-wave retarder can be used in combination with the fixed polarizer plate as a variable bandpass filter. Such a variable half-wave retarder in combination with the fixed polarizer plate can also be used as the shutter.

The foregoing description is considered as illustrative of the principles of the invention. Furthermore, since numerous modifications and changes will readily occur to those skilled in the art, it is not desired to limit the invention to the exact construction and process shown and described above. Accordingly, resort may be made to all suitable modifications and equivalents that fall within the scope of the invention. The words "comprise," "comprises," "comprising," "include," "including," and "includes" when used in this specification are intended to specify the presence of stated features, integers, components, or steps, but they do not preclude the presence or addition of one or more other features, integers, components, steps, or groups thereof.

The embodiments of the invention in which an exclusive property or privilege is claimed are defined as follows:

1. A system for convolving and summing frames of data, comprising:
   a first sensor-display device comprising an array of transmit-receive modules, each transmit-receive module comprising a light sensor element, a light transmitter element, and a memory bank comprised of a plurality of memory cells;

a second sensor display device comprising an array of transmit-receive modules, each transmit-receive module comprising a light sensor element, a light transmitter element, and a memory bank comprised of a plurality of memory cells;

a radial modulator device having a plurality of modulator elements positioned at multiple radial distances and angular orientations in relation to an optic axis; and a first Fourier transform lens positioned between the light transmitter elements of the first sensor-display device and the radial modulator device, and a second Fourier transform lens positioned between the light transmitter elements of the second sensor-display device and the radial modulator device, and said radial modulator device being positioned a focal length from the first Fourier transform lens and a focal length from the second Fourier transform lens so that the radial modulator device is positioned in the Fourier transform planes of both the first Fourier transform lens and the second Fourier transform lens.

2. The system of claim 1, including system control components for forming and feeding filters to the radial modulator device and for sequencing transmissions of light fields with frames of data from the first and second sensor-display devices, convolving the frames of data with the filters at in the radial modulator device, and sensing light fields comprising convolved frames of data from the radial modulator device.

3. The system of claim 1, wherein the light sensor elements of the first sensor-display device and of the second sensor-display device are capacitive light sensors in which charges from sensed light accumulate.

4. A method of convolving and summing frames of data for a convolutional neural network, comprising:

sequentially projecting the frames of data as a light fields in spatial domain along a first optic axis;

creating Fourier transforms of the light fields in sequence at a Fourier transform plane;

convolving the light fields in sequence at the Fourier transform plane with a light modulator that has light modulating segments spaced at various radial distances and angular orientations with respect to the optic axis;

inverse-Fourier transforming the sequence of convolved light fields back into spatial domain at a first sensor display location;

sensing at the first sensor-display location of each of the convolved light fields in the spatial domain on a pixel-by-pixel basis with capacitive light sensors at the pixel locations that have electric charge building capacity;

allowing the capacitive light sensors to accumulate the electric charges resulting from sensing in sequence the convolved light fields at the first sensor-display location; and shifting the accumulated electric charges in each sensor after sensing a plurality of convolved light fields to a memory cell in a memory bank such that the memory cell contains the accumulated electric charges resulting from sensed light at a particular pixel location for the light fields that have been sensed in the sequence.

5. The method of claim 4, including:

convolving additional sequences of light fields comprising frames of data with the light modulator applying different filters;

sensing the additional sequences of convolved light fields on a pixel-by-pixel basis with the capacitive sensors and accumulating electric charges that result from the sensing at each pixel location;

shifting the accumulated electric charges in each sensor after sensing a plurality of the convolved light fields to the memory cell that had the previously accumulated electric charge while shifting that previously accumulated electric charge to another memory cell in the memory bank; and repeating those processes to build a 3D convolution block of convolved and summed frames of data in the memory banks at each pixel location at the first sensor-display location.

6. The method of claim 5, including processes comprising:

transmitting and Fourier transforming the convolved and summed frames of data that form the 3D convolution block in sequential light fields from the pixel locations at the first sensor-display location back to the modulator in the Fourier transform plane;

convolving the light fields in sequence at the Fourier transform plane with a light modulator that has light modulating segments spaced at various radial distances and angular orientations with respect to the optic axis;

inverse-Fourier transforming the sequence of convolved light fields back into spatial domain at a second sensor display location;

sensing at the second sensor-display location each of the convolved light fields in the spatial domain on a pixel-by-pixel basis with capacitive light sensors at the pixel locations that have electric charge building capacity;

allowing the capacitive light sensors to accumulate the electric charges resulting from sensing in sequence the convolved light fields at the second sensor-display location;

convolving additional sequences of light fields comprising frames of data with the light modulator applying different filters;

sensing at the second sensor-display location the additional sequences of convolved light fields on a pixel-by-pixel basis with the capacitive sensors and accumulating electric charges that result from the sensing at each pixel location;

shifting the accumulated electric charges in each sensor at the second sensor-receiver location after sensing a plurality of the convolved light fields to the memory cell that had the previously accumulated electric charge while shifting that previously accumulated electric charge to another memory cell in the memory bank; and repeating those processes to build a 3D convolution block of convolved and summed frames of data in the memory banks at each pixel location at the second sensor-display location.

7. The method of claim 6, including repeating the processes in additional cycles.

8. The method of claim 7, including pooling pluralities of the sensors and memory banks together in repeated cycles of the processes.

9. The method of claim 7, including Max pooling of the pluralities of sensors and memory banks.

10. The method of claim 6, including transmitting the convolved and summed frames of data on a pixel-by-pixel basis with light transmitter elements at the pixel locations at the first sensor-display location.

* * * * *